United States Patent
Someya et al.

(10) Patent No.: US 7,283,161 B2
(45) Date of Patent: Oct. 16, 2007

(54) IMAGE-TAKING APPARATUS CAPABLE OF DISTRIBUTING TAKEN IMAGES OVER NETWORK

(75) Inventors: Hiromi Someya, Tokyo (JP); Toshiki Ishino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 743 days.

(21) Appl. No.: 10/756,848

(22) Filed: Jan. 13, 2004

(65) Prior Publication Data

US 2004/0145659 A1 Jul. 29, 2004

(30) Foreign Application Priority Data

Jan. 21, 2003 (JP) ............................. 2003-012782
Jan. 31, 2003 (JP) ............................. 2003-025175

(51) Int. Cl.
*H04N 5/232* (2006.01)
*H04N 7/18* (2006.01)

(52) U.S. Cl. ..................................... 348/211.9; 348/156

(58) Field of Classification Search ................ 348/143, 348/151–153, 159, 211.99, 211.1–211.4, 348/211.8, 211.11–211.13, 156, 211.9
See application file for complete search history.

(56) References Cited

U.S. PATENT DOCUMENTS

| | | | | | |
|---|---|---|---|---|---|
| 5,373,341 | A | * | 12/1994 | SanGregory | ................ 396/147 |
| 6,208,379 | B1 | * | 3/2001 | Oya et al. | ................ 348/211.11 |
| 6,768,563 | B1 | * | 7/2004 | Murata et al. | ............... 358/450 |
| 2001/0024233 | A1 | * | 9/2001 | Urisaka et al. | ............. 348/213 |
| 2001/0045983 | A1 | | 11/2001 | Okazaki et al. | |
| 2002/0008758 | A1 | * | 1/2002 | Broemmelsiek et al. | .... 348/143 |
| 2003/0103139 | A1 | * | 6/2003 | Pretzer et al. | ............... 348/143 |

FOREIGN PATENT DOCUMENTS

| | | | |
|---|---|---|---|
| EP | 0 729 275 | A2 | 2/1996 |
| EP | 1 081 955 | A2 | 8/2000 |
| JP | 2000115619 | A * | 4/2000 |
| JP | 2000197031 | A * | 7/2000 |
| JP | 2001-69494 | | 3/2001 |
| JP | 2001-189932 | | 7/2001 |
| JP | 2001-189932 | A | 7/2001 |
| JP | 2001-333319 | A | 11/2001 |

OTHER PUBLICATIONS

European Search Report, dated Feb. 25, 2004.

* cited by examiner

*Primary Examiner*—Lin Ye
*Assistant Examiner*—Timothy J Henn
(74) *Attorney, Agent, or Firm*—Morgan & Finnegan, L.L.P.

(57) ABSTRACT

An image-taking apparatus and an image-taking system are disclosed which can protect the privacy of a person whose image is taken, and which can avoid the distribution of images of unnecessarily large data volumes. The image-taking apparatus includes an image-taking optical system, an image-pickup device, a controller which performs, by using the image-pickup device, image-taking in a first mode and in a second mode in which image-taking is carried out with more pixels or at a lower frame rate than in the first mode. The controller determines whether a condition relating to image-taking matches a predetermined restriction condition, and restricts image-taking in the second mode or distribution of an image taken in the second mode when that restriction condition is met.

13 Claims, 18 Drawing Sheets

!!

NETWORK DISTRIBUTION OF THE IMAGE YOU ARE TRYING TO TAKE IS PROHIBITED BY THE ADMINISTRATOR.

THE TAKEN IMAGES WILL BE STORED ON THE SERVER.

IF YOU HAVE ANY QUESTIONS ABOUT THIS, PLEASE CONTACT ADMIN@XXX.XXX.XX.XX

FIG. 9

IMAGE-TAKING APPARATUS CAPABLE OF DISTRIBUTING TAKEN IMAGES OVER NETWORK

BACKGROUND OF THE INVENTION

1. Field of the Invention

The present invention relates to image-taking apparatuses which can distribute taken images over a network, such as a LAN, or the Internet.

2. Description of Related Art

In recent years, image-taking apparatuses referred to as "network cameras" which directly distribute image information over a LAN or the Internet are increasingly replacing cameras which save images (moving images or still images) that have been taken on recording media, such as tape or film. Such network cameras can be installed in a scenic spot or a busy street, or at an inaccessible location, and images of that place can be viewed live without actually going to that location.

Such network cameras are connected to a network, such as a LAN, and the taken images are displayed on the display monitors of personal computers connected to the network.

Moreover, over the network such network cameras can be caused to perform such camera operations as panning, tilting or zooming, and can be caused to take images of the typically desired direction or size on the network.

In current network cameras, there is a limit to the capacity of communication lines, and when moving images are taken at a rate of 30 frames per second, then the resolution is limited about to CIF level (352×288 pixels) However, the resolution of image-pickup devices, such as CCDs, is getting higher, and there are also video cameras on the market that have a function of taking still images with high resolution. These use image-pickup devices with many pixels, and take the images at NTSC level or PAL level when taking moving images, but use the pixels fully when taking still images, thus achieving high resolutions of the XGA level and higher.

Moreover, also future network cameras take video at the CIF level and film moving images at 30 frames per second, but for still images or at low frame levels of only one or two frames per second, they may take images at high resolutions of XGA level or higher (see Japanese Patent Application Laid-Open No. 2001-189932).

Different from images taken with ordinary video cameras or the like, the images taken with such network cameras are anonymous in the sense that the camera may be operated by an unspecified large number of people over the network, and it is unknown who takes which images. For this reason, it is necessary to respect the privacy of the people whose images are taken, to avoid image-taking with ill intent.

Moreover, the image-taking lenses used for video cameras or network cameras often have a very high magnifying power with a zoom ratio of ×10 to ×20, so that converting this to 35 mm film, it becomes possible to take images ranging from standard regions of about 40 mm to very far regions of maximally about 800 mm. With far regions with a focal length of 800 mm, the faces of people located far away can be magnified greatly, such that they can be pictured clearly. Therefore, it becomes even more necessary to respect the privacy of the pictured people.

For surveillance cameras, it has been suggested to take images while respecting privacy by masking a portion of the image, as has been proposed in Japanese Patent Application Laid-Open No. 2001-69494 (corresponding to European Patent Application Publication 1 081 955 A2).

However, the proposal of Japanese Patent Application Laid-Open No. 2001-69494 can be used only in the closed environment of a surveillance camera, and if the taken images can be viewed openly by an unspecified large number of people, as in the case of a network camera, then the masked portion becomes unsightly, compromising the appeal of the images.

Moreover, since moving images and still images are taken with the same image-pickup device and distributed to the network using the same line, there is a limit to the distribution of ordinary moving images if large data volumes of images, such as still images of high image quality, are distributed. Therefore, there is a need for avoiding the distribution of unnecessarily large data amounts of images that are out of focus or not properly exposed.

SUMMARY OF THE INVENTION

It is thus an object of the present invention to provide an image-taking apparatus and an image-taking system, with which the privacy of a person whose image is taken can be protected and with which the distribution of images of unnecessary large data volumes can be prevented.

In order to achieve this object, in one aspect of the present invention, an image-taking apparatus which is operated through a network from a terminal apparatus and which distributes taken images over the network includes an image-taking optical system; an image-pickup device which photoelectrically converts an object image formed by the image-taking optical system; and a controller which performs, by using the image-pickup device, image-taking in a first mode and image-taking in a second mode in which image-taking is carried out with more pixels or at a lower frame rate than in the first mode. The controller determines whether a condition relating to image-taking matches a predetermined restriction condition, and performs a restriction operation which restricts image-taking in the second mode or distribution of an image taken in the second mode when that restriction condition is met.

Here, the restriction operation includes the operation of prohibiting and the operation of conditionally allowing the image-taking in the second mode or the distribution of an image taken in the second mode.

These and further objects and features of the image-taking apparatus and image-taking system according to the present invention will become apparent from the following detailed description of preferred embodiments thereof taken in conjunction with the accompanying drawings.

BRIEF DESCRIPTION OF THE DRAWINGS

FIG. 9 shows an example of a warning image which is distributed by the network camera of Embodiment 3.

DETAILED DESCRIPTION OF THE PREFERRED EMBODIMENTS

The following is a detailed description of embodiments of the present invention, with reference to the accompanying drawings.

Embodiment 1

Figure 1A:
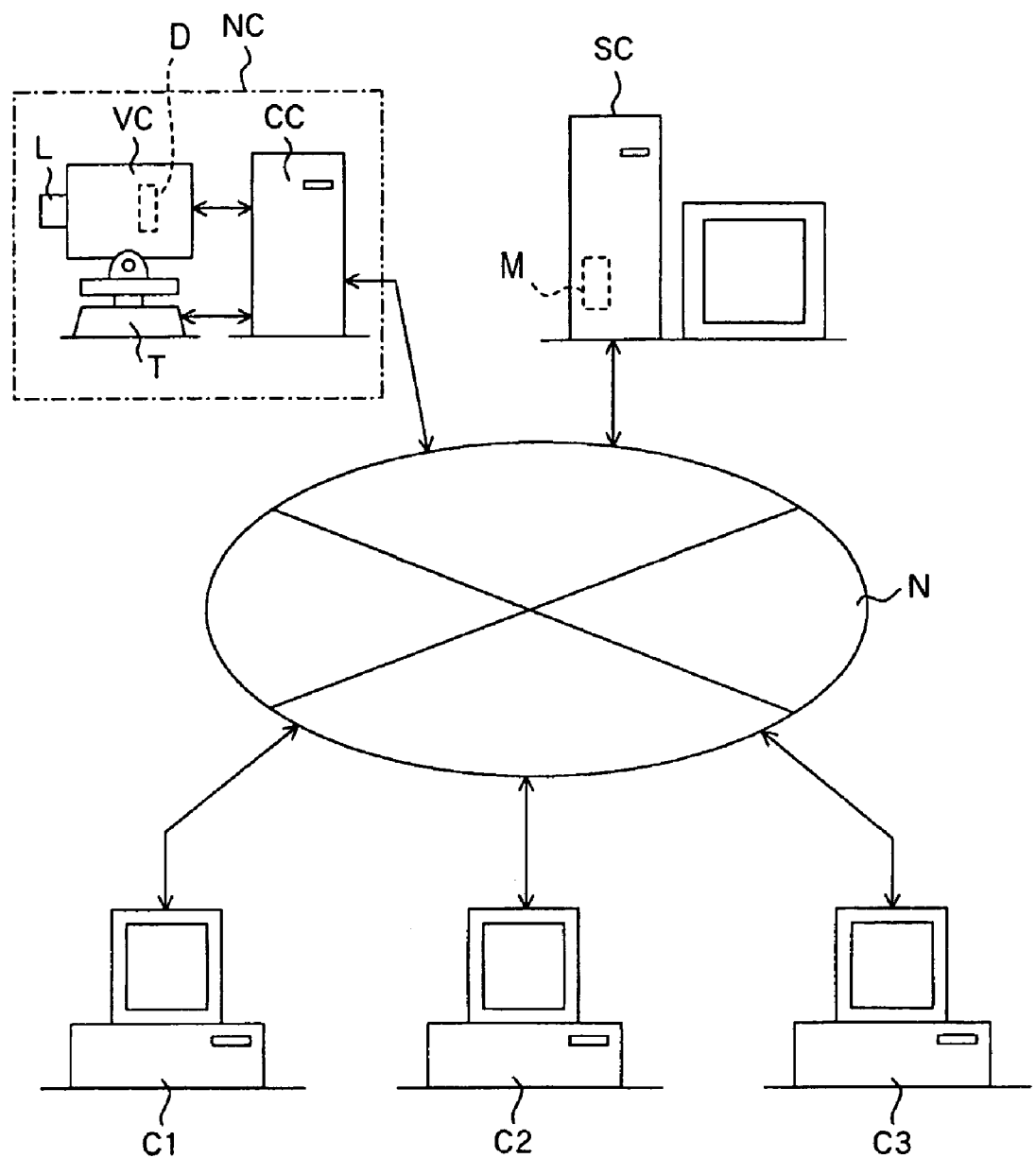
FIG. 1 schematically shows the overall structure of a network image-taking system according to Embodiment 1 of the present invention.

FIG. 1A schematically illustrates the structure of a network image-taking system using a network camera (image-taking apparatus) according to Embodiment 1. N denotes a network such as a LAN, a WAN, the Internet, or an Ethernet network. It should be noted that this network N is not necessarily a wired network, but may also be a wireless network. VC denotes a video camera which can take moving images and still images.

The video camera VC is mounted on a pan head T in a busy street or a tourism spot or the like. Panning and tilting is possible by operating the pan head T and zooming is possible by operating an image-taking lens L.

This video camera VC takes images by photoelectrically converting with an image-pickup device (photoelectric conversion device) D, such as a CCD or CMOS sensor, object images formed with a zoomable image-taking lens (image-taking optical system) L. Moreover, the video camera VC can take the object image in either a first image-taking mode for taking moving images at a low-resolution CIF level, or a second image-taking mode for taking images (moving images or still images) at a high resolution with a higher pixel number or with a lower frame rate than in the first image-taking mode, attaining images with a higher precision then in the CIF level.

Moreover, the video camera VC is connected to a control computer CC, serving as a controller which performs the image-taking mode settings and controls the zooming of the image-taking mode of the video camera, and controls the panning and tilting operation of the pan head T, based on control signals from ordinary computers (explained below), which are input over the network N. This control computer CC is also connected to the network N.

It should be noted that a network camera NC is configured by the video camera VC, the pan head T and the control computer CC. Moreover, in FIG. 1A, the video camera VC and the control computer CC are shown to be separate, but they also may be integrated into one system.

Moreover, SC denotes a server computer which can obtain image data taken with the video camera VC from the control computer CC through the network N and save the image data. This server computer SC is an administrative computer used by an administrator who administrates the operation of the network camera NC, and is connected to the network N. It should be noted that the image saving function of the server computer SC may also be incorporated in the control computer CC.

An image viewing site (web page) which makes it possible to view and enjoy images that have been taken by the network camera NC is set up by the administrator on the server computer SC. The control computer CC distributes the images taken by the video camera VC through this image viewing site to ordinary computers on the network N (in the following, this is simply referred to as "distribution over the network N").

Moreover, C1 to C3 denote ordinary (client) computers which are connected to the network N. It should be noted that FIG. 1A shows only three ordinary computers, but in practice there may be many more computers. The user (referred to as "operator" below) of one of the ordinary computers C1 to C3 who has obtained the right to operate the network camera NC through the network and the image viewing site can access the control computer CC over the network N and the server computer SC, and, via the control computer CC, can cause a panning or tilting operation of the pan head T, or a zooming operation of the video camera VC, and can select the desired image-taking direction and image-taking field angle (image-taking zoom ratio). Moreover, the operator can also select the image-taking mode of the network camera NC.

Figure 1B:
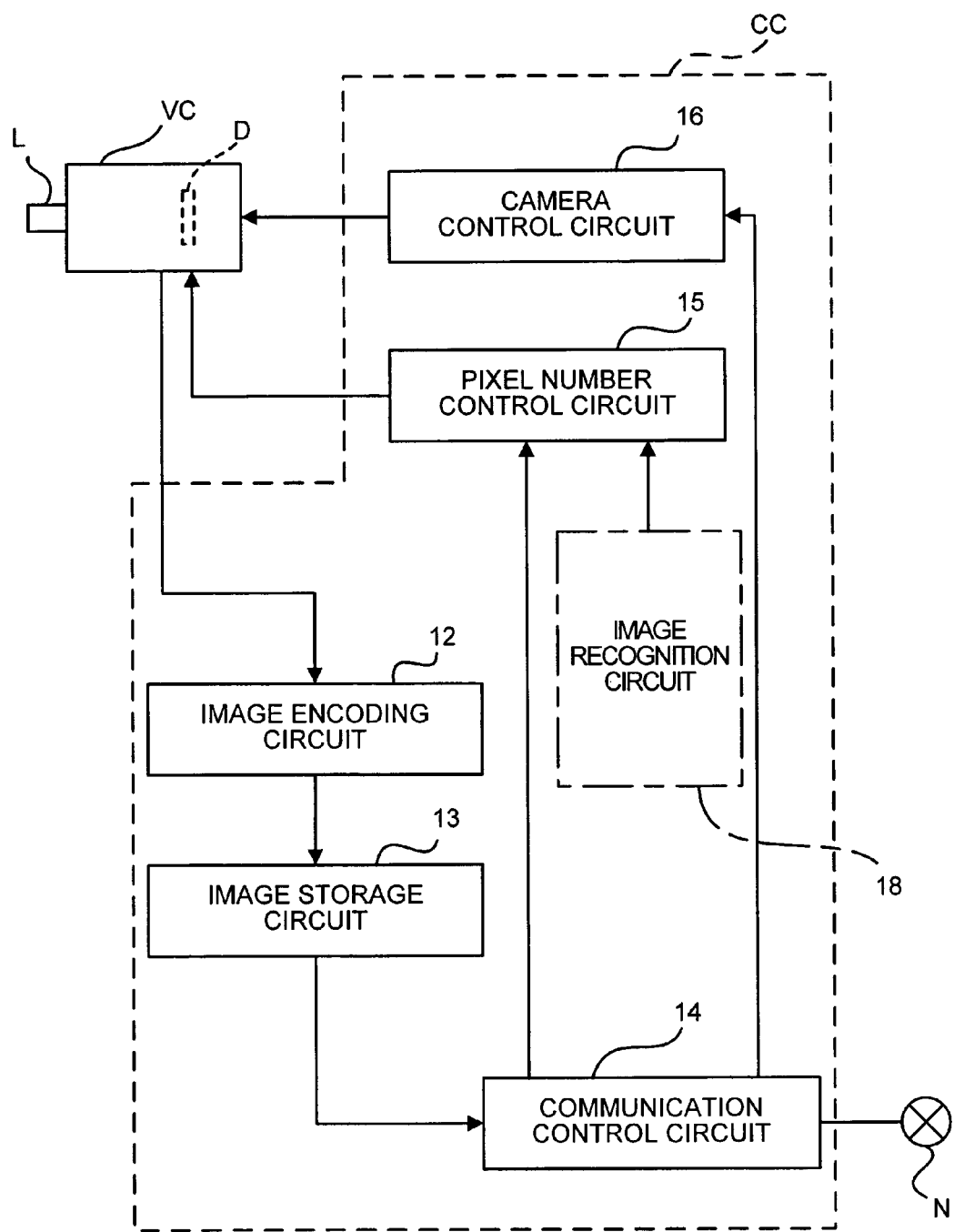

FIG. 1B shows a specific structure of the control computer CC. Reference numeral 12 denotes an image encoding circuit which encodes data of images (moving images or still images) taken with the camera VC, and reference numeral 13 denotes an image storage circuit which stores the encoded image data.

If moving images are taken at a high frame rate of 30 frames per second with the camera VC, then images are taken at a regular resolution of the CIF level (352×288 pixels), the NTSC level or the PAL level, due to restrictions on the image processing speed or the capacity of the communication line.

The camera VC of this embodiment has an image-pickup device D with a high number of pixels which is suitable for high-resolution image taking. By using an image-pickup device D with a high number of pixels, it is possible to take images at a regular resolution of the CIF level, the NTSC level or the PAL level when taking images at a high frame rate of 30 frames per second, and to use the pixels of the image-pickup device D fully and take images at a resolution that is higher than the regular resolution, for example at XGA level (1024×768 pixels) when taking still images or when taking images at a low frame rate of one or two frames per second.

Reference numeral 15 denotes a pixel number control circuit which switches between taking images at regular resolution and high frame rate (first image-taking mode) and taking still images or moving images with low frame rate at high resolution (second image taking mode). Reference numeral 16 denotes a camera control circuit which controls the panning, tilting and zooming of the camera 11.

Reference numeral 14 denotes a communication control circuit which sends the taken images over the network N to the server computer SC. The communication control circuit 14 also receives pan, tilt and zoom control signals and image-taking resolution command signals over the network N from the server computer SC.

The received pan, tilt and zoom control signals are sent to the camera control circuit 16, and the image-taking resolution command signals are sent to the pixel number control circuit 15. This enables the operation of the camera VC with the ordinary computers C1 to C3.

When the pixel number control circuit 15 receives a signal commanding image-taking at regular resolution, then it lets the camera VC take images at a pixel number corresponding to the CIF level (first image-taking mode) And only when certain restriction conditions to be explained later are not met, then the pixel number control circuit 15 which has received a signal commanding high-resolution image-taking switches the number of image-taking pixels at the camera VC to a high pixel number, such as the XGA level, and lets the camera VC take images in the second image-taking mode.

The images that are thus taken are sent to the image encoding circuit 12, which performs a compression process, and are temporarily stored in the image storage circuit 13. When there is an image send request from the server computer SC, then the communication control circuit 14 reads out the corresponding image data from the image storage circuit 13, and sends the image data over the network N to the server computer SC.

Figure 2:
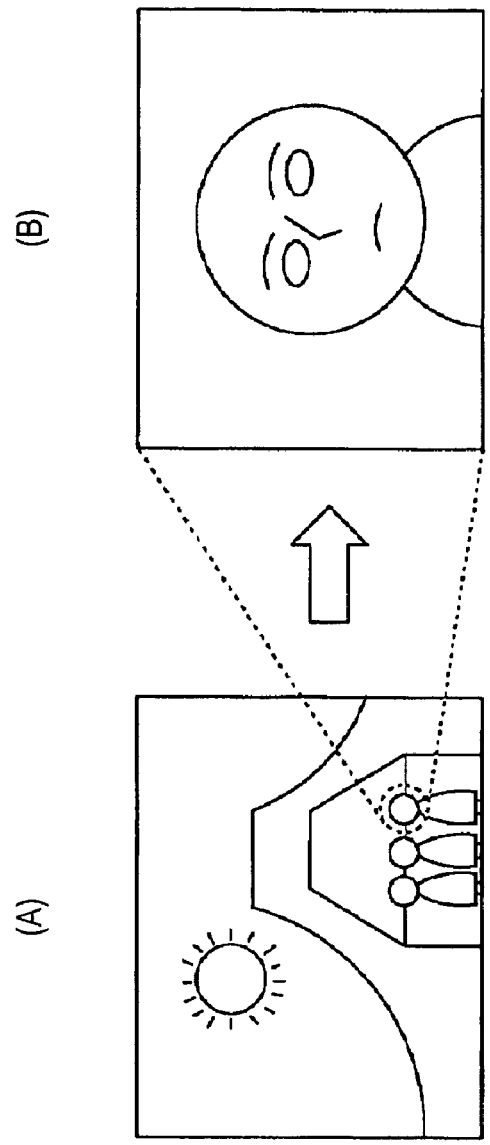
FIG. 2 shows images taken with a network camera used in the network image-taking system according to Embodiment 1.

FIG. 2(A) schematically shows an image taken with the network camera NC of this embodiment. In FIG. 2(A), the focal length of the image-taking lens L is set to the wide side (short focal length), thus taking a wide image-taking region. In this situation, the control computer CC lets the video camera VC take images in the first image-taking mode and distributes the taken images over the network N, and lets the video camera VC take images in the second image-taking mode and distributes the taken images over the network N.

When the operator performs, from the state shown in FIG. 2(A), a zoom operation of the network camera NC through one of the ordinary computers C1 to C3, and changes the focal length of the image-taking lens L to the telephoto side (long focal length), the face of a person contained in the image-taking field may be pictured in a close-up view, as shown in FIG. 2(B). In this situation, the control computer CC takes moving images at the low resolution of the first image-taking mode and distributes those moving images over the network N, but prohibits the taking of high-precision images in the second image-taking mode. That is to say, even when the switches, through one of the ordinary computers C1 to C3, to the taking of a close-up image of the person's face at high resolution, the control computer CC will not accept this (and cancels), and maintains the image-taking state of the first image-taking mode. Thus, the privacy of the person can be respected.

Figure 3:
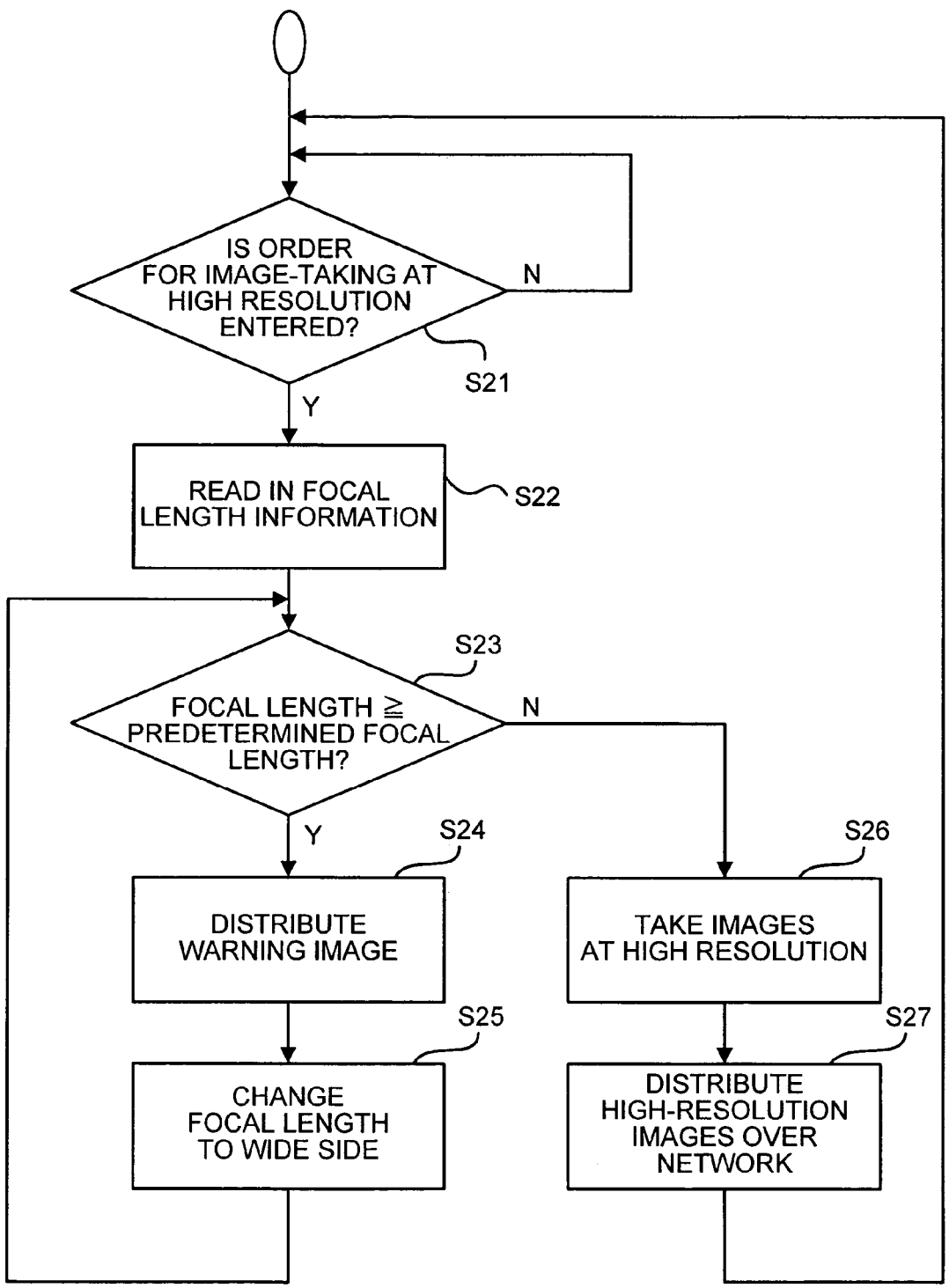
FIG. 3 is a flowchart illustrating the operation of the network camera of Embodiment 1.

FIG. 3 is a flowchart showing the operation of the network camera NC of this embodiment (mainly the pixel number control circuit 15).

In the moving image taking state with a low resolution of 30 frames per second (image-taking state in the first image-taking mode), when, at Step 21 (in the figures, "Step" is abbreviated as "S"), an order to switch to high-resolution image-taking (second image-taking mode) is entered from any of the ordinary computers C1 to C3 to the control computer CC, then the procedure advances to Step 22, and the control computer CC (pixel number control circuit 15) detects the current focal length of the image-taking lens L in the video camera VC. This focal length can be detected by reading focal length information that is sent from the video camera VC to the control computer CC.

At Step 23, the control computer CC determines whether the detected focal length of the image-taking lens L is equal to or longer than a predetermined focal length on the telephoto side at which the face of a person contained in the image-taking region is pictured clearly. If the detected focal length is equal to or longer than the predetermined focal length, then the procedure advances to Step 24, and the order to switch to high-resolution image-taking is not accepted (are cancelled), and a warning image stating that such image-taking is prohibited is distributed over the network N.

Here, the specific numerical figure of the predetermined focal length will depend on the location where the network camera NC is installed and its image-taking resolution, and in a telephoto region of at least 200 mm (in terms of 35 mm film format), the face of a person that is somewhat far away can be taken at quite a close-up, and it is possible to identify the person that is taken with high resolution at this focal length (image-taking zoom ratio), so that it would appear to be better to take into account the privacy of the person, and not to take images of him/her. It should be noted that this focal length of 200 mm is merely an example, and appropriate settings may be made by the administrator through the server computer SC, in consideration of the location where the network camera NC is installed and its image-taking resolution, as noted above.

At Step 25, after this warning image has been distributed, the control computer CC sends a control signal to the video camera VC, and changes the focal length of the image-taking lens L to a focal length at which the field angle is wider than at the predetermined focal length.

Then, the procedure returns to Step 23, and it is determined whether the focal length of the image-taking lens L is equal to or longer than the predetermined focal length. At this time, the focal length of the image-taking lens L has been changed to a distance at which the field angle is wider than at the predetermined focal length, so that, at Step 26, the control computer CC switches the video camera VC to the second image-taking mode and lets it take an image at high resolution, and at Step 27, the image taken with high precision is distributed over the network N.

This embodiment has been explained for the case that at Step 25, the focal length of the image-taking lens L is changed to the wide-angle side and image-taking at high resolution is allowed, but it is also possible to eliminate Step 25, distribute a warning image and prohibit the image-taking.

Moreover, this embodiment has been explained for the case that image-taking at high resolutions is prohibited when the focal length of the image-taking lens L is equal to or longer than the predetermined focal length, but by adding to the restriction condition relating to the focal length the condition that the distance to the object to be pictured (object distance) is equal to or shorter than a predetermined object distance, it is possible to determine whether an image is taken that may actually affect the privacy of a person in the image, and whether image-taking at high resolution should be prohibited immediately. Thus, it is possible to respect the privacy of a person in a taken image without compromising the requests by the users of the ordinary computers C1 to C3 that want to enjoy the taken images (that is, the original purpose of the network camera).

Embodiment 2

In Embodiment 1, a case has been explained in which it is decided, based on the focal length (image-taking zoom ratio) of the image-taking lens L or the object distance, whether high-resolution image-taking is prohibited or not, but it is also possible to decide whether high-resolution image-taking is prohibited or not, depending on whether the object to be pictured is a specific object, such as a person (in particular, a face).

In that case, an image recognition circuit 18 is provided inside the control computer CC, as shown by a dotted line in FIG. 1B, and it is determined whether there is a specific object in the image-taking field. It should be noted that the image recognition circuit 18 also may be provided outside the control computer CC.

More specifically, for the image recognition circuit 18, a circuit may be used that can discriminate shapes of objects by edge detection in the image taken at low resolution in the first image-taking mode. When this image recognition circuit 18 recognizes that there is the shape of a close-up of a person's face in the taken image, as shown in FIG. 4(A), or that there is the shape of a close-up of a window of a building, such as an apartment building or a residence, as shown in FIG. 4(B), then the control computer CC (the pixel number control circuit 15) prohibits the high-resolution image-taking of the specified object.

Figure 4:
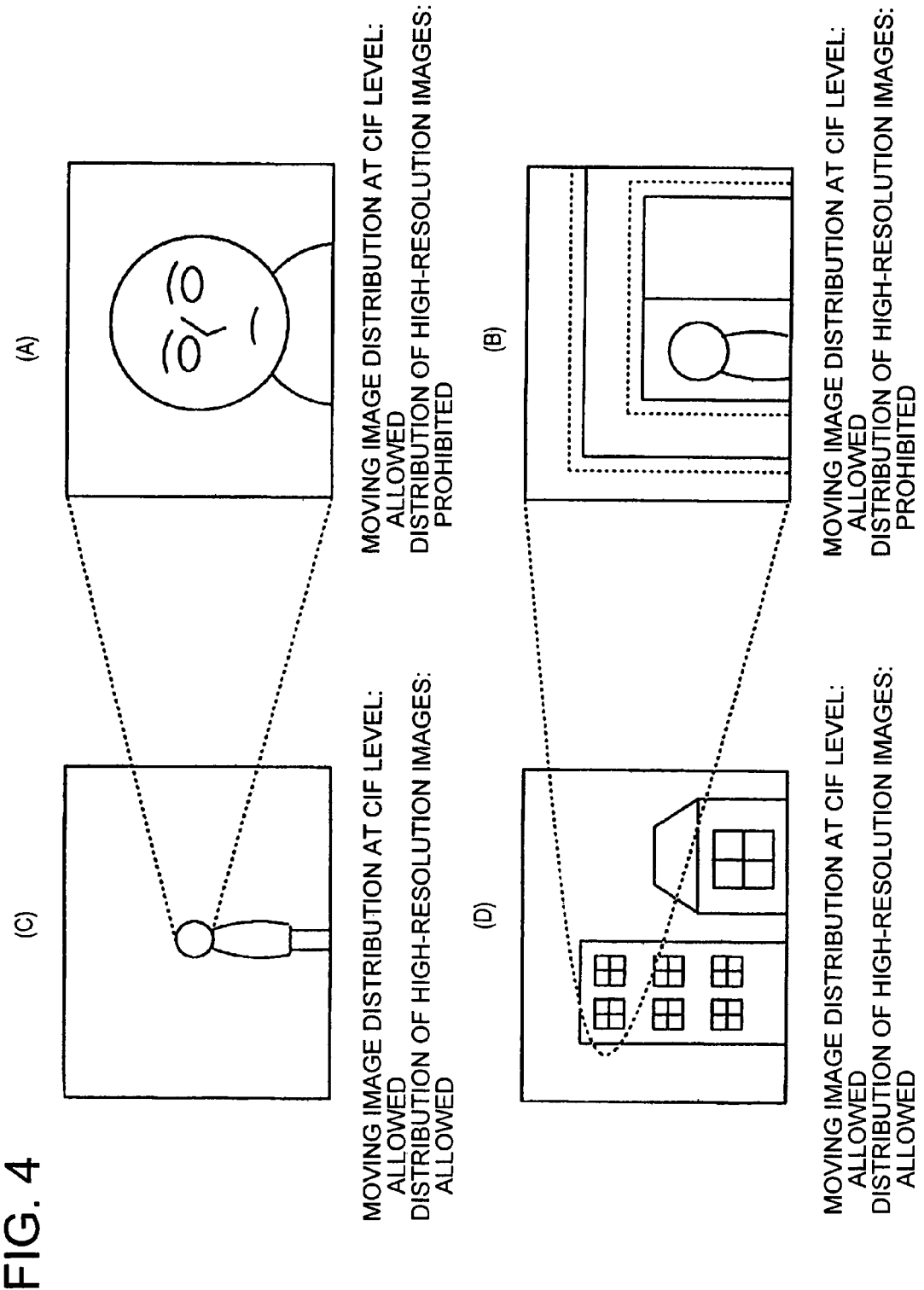
FIG. 4 shows images taken with a network camera according to Embodiment 2 of the present invention.

However, even when it is attempted to take a person's face or a window of a building at high resolution, as shown in FIGS. 4(C) and 4(D), if the object inside the image-taking field is small (for example, when the focal length of the image-taking lens L is short or the object distance is long, as in Embodiment 1) and it is not possible to identify a person who is the object, then the privacy of the person is not compromised, even when he/she is taken at high resolution, so that image-taking at high resolution is allowed, and also the distribution of the taken image over the network N is allowed.

Figure 5:
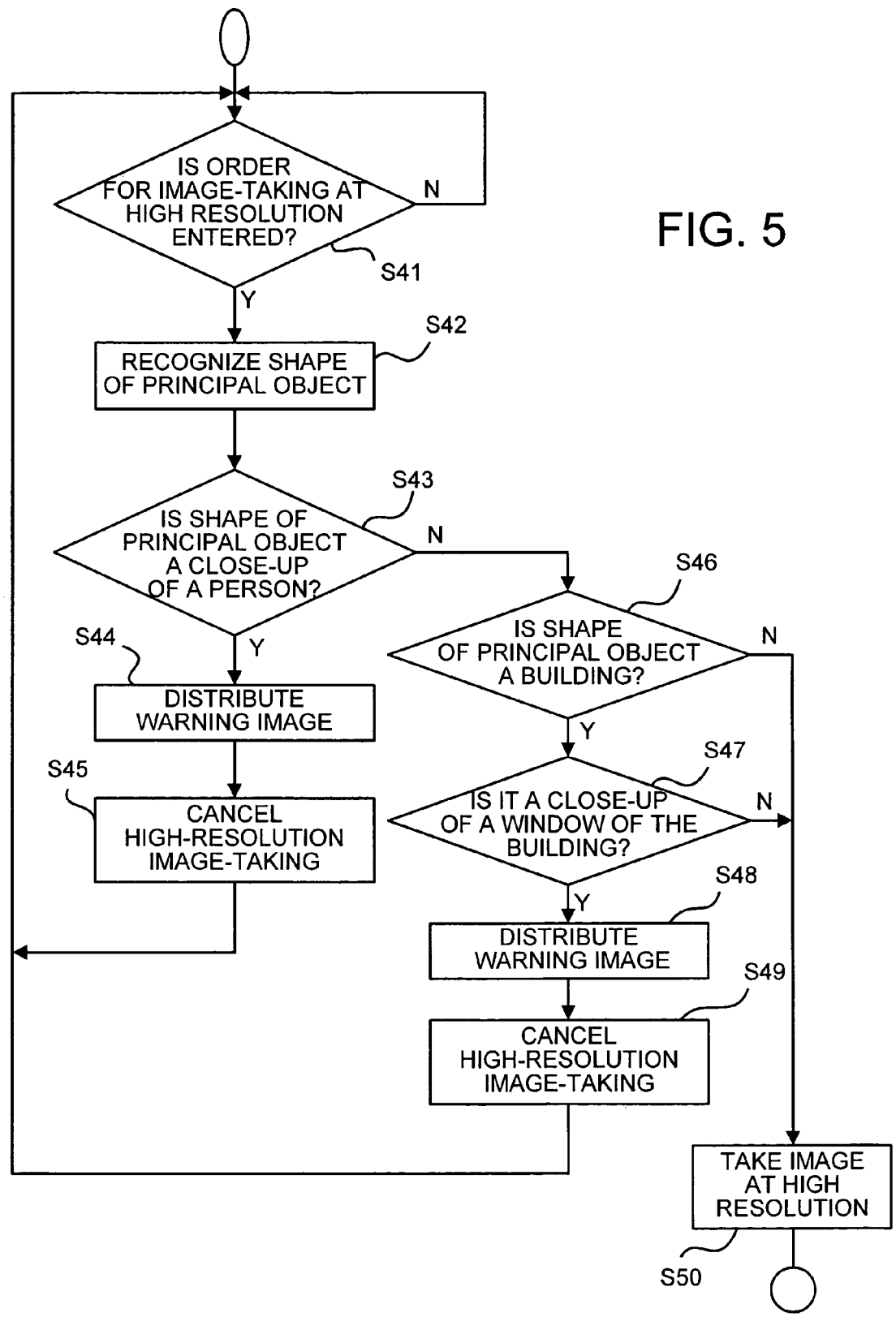
FIG. 5 is a flowchart illustrating the operation of the network camera of Embodiment 2.

FIG. 5 is a flowchart showing the operation of the network camera NC of this embodiment (mainly the pixel number control circuit 15). It should be noted that the overall structure of the network image-taking system is similar to that of Embodiment 1.

In the moving image taking state with a low resolution of 30 frames per second (image-taking state in the first image-taking mode), when, at Step 41, an order to switch to high-resolution image-taking (second image-taking mode) is entered from any of the ordinary computers C1 to C3 to the control computer CC, then the procedure advances to Step 42, and the control computer CC (pixel number control circuit 15) lets the image recognition circuit 18 perform a recognition of the shape of the principal object to be taken by the video camera VC.

Then, at Step 43, the control computer CC lets the image recognition circuit 18 determine whether the principal object whose shape has been recognized is a close-up of a person. In particular, it is determined whether it is a close-up of a person's face based on the edge shape of face contour, eyes, nose and mouth.

Here, if it is determined that the principal object is a person, then the procedure advances to Step 44, and the control computer CC distributes over the network N a warning image stating that such image-taking is prohibited, and at Step 45, the order to switch to high-resolution image-taking is canceled.

On the other hand, when it is determined at Step 43 that the principal image is not the close-up of a person, then the procedure advances to Step 46. At Step 46, the control computer CC lets the image recognition circuit 18 determine whether the principal image is a building, such as an apartment block, an office building or a residence.

This determination whether the principal object is a building, such as an apartment block, an office building or a residence, can be performed based on such characteristics as that there are distinct straight edges, and that straight lines distinctly partition the image into window glass and wall faces.

If it is determined at Step 46 that the principal object is not a building but for example a landscape, then the procedure advances to Step 50, and the control computer CC switches the video camera VC into the second image-taking mode to let it perform image-taking at high resolution, and the image taken with high precision is distributed over the network N.

If the image recognition circuit 18 determines at Step 46 that the principal object is a building, then the procedure advances to Step 47, and the control computer CC lets the image recognition circuit 18 determine whether the principal object is a close-up of a window of a building. When a close-up of the window of a building is taken, then the person in that building or the details of that room may be pictured, which is not preferable with regard to privacy.

The determination whether the principal object is a window can be performed based on such characteristics as whether edges are made of straight lines, whether the contrast ratio between wall and window is large, and whether the proportion taken up by the window portion in the image-taking field is large.

If it is determined that the principal object is a close-up of a window, then the procedure advances to Step 48, and the control computer CC distributes over the network N a warning image stating that such image-taking is prohibited, and cancels the order to switch to high-resolution image-taking at Step 49.

Moreover, if the principal object is neither a person (Step 43), nor a building (Step 46) nor a close-up of a window of a building (Step 47), then the procedure advances to Step 50, and the control computer CC switches the video camera VC to the second image-taking mode, and lets it take images at high resolution, and the high-precision image is distributed over the network N.

This embodiment has been explained for the case that the determination whether the principal object is a close-up of a window is performed by the image recognition circuit 18 with the proportion occupied by the window portion in the image-taking field, but it is also possible to make this determination by judging whether the focal length of the image-taking lens L is equal to or longer than a predetermined focal length on the telephoto side, as in Embodiment 1.

Embodiment 3

In Embodiments 1 and 2, cases have been explained in which image-taking at high resolutions is prohibited in accordance with the result of detecting the focal length of the image-taking lens L or the result of determining the object with an image recognition circuit. This embodiment explains the case that the administrator of the network camera NC can freely set a region at which high-resolution image-taking is prohibited.

Figure 6:
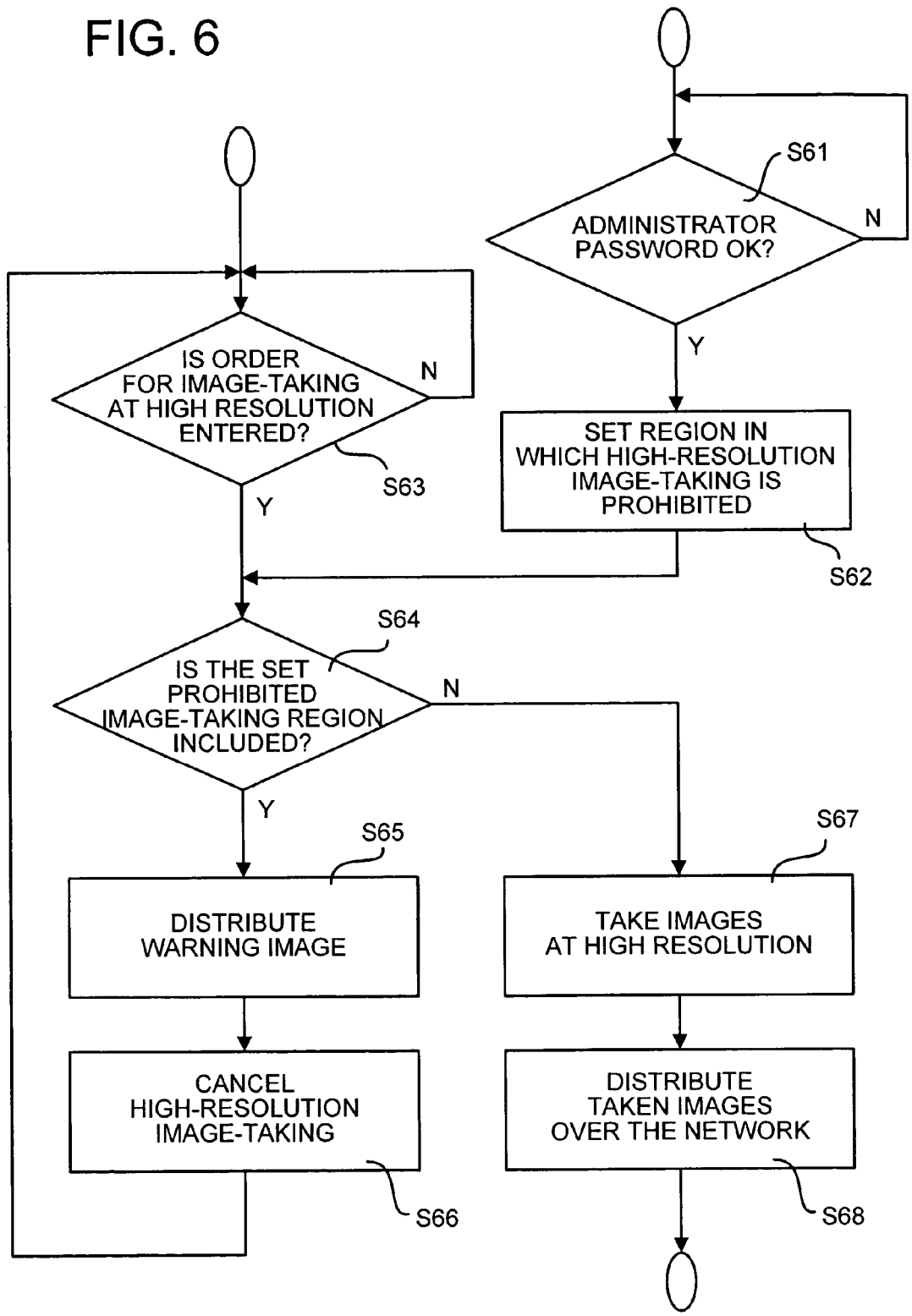
FIG. 6 is a flowchart illustrating the operation of the network camera used in the network image-taking system according to Embodiment 3 of the present invention.

FIG. 6 is a flowchart showing the operation of the network camera NC of Embodiment 3 (mainly the pixel number control circuit 15). It should be noted that the overall structure of the network image-taking system is similar to that of Embodiment 1.

First, at Step 61, the administrator enters into the control computer CC, via the server computer SC, an administrator password for setting or changing an image-taking restriction condition of the network camera NC in the control computer CC, and if the verification of this password is successful, then the procedure advances to Step 62. At Step 62, the administrator can freely set a region in which image-taking at high resolution is prohibited, through driver software for the network camera NC installed on the server computer SC.

Figure 7:
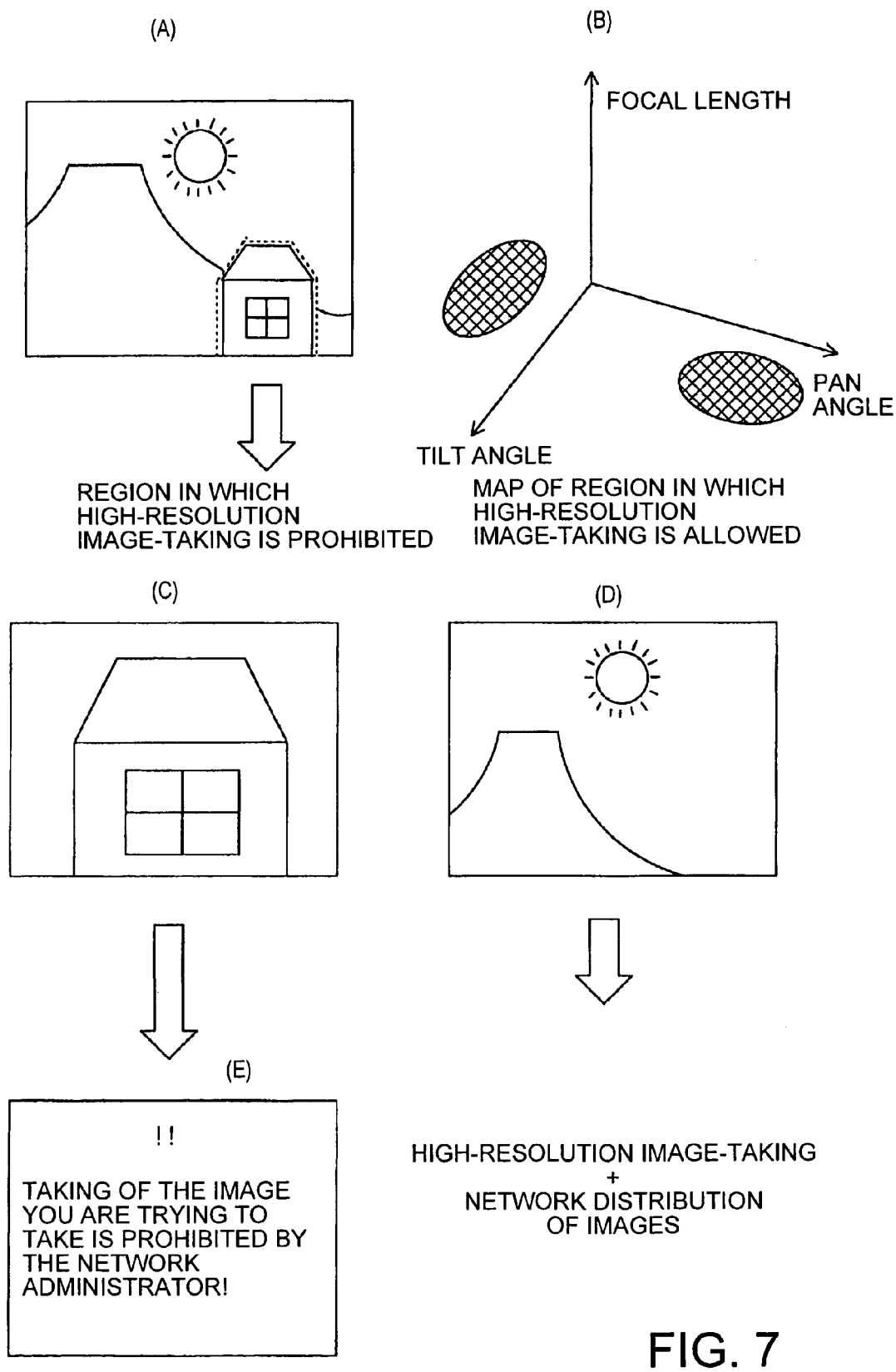
FIG. 7 schematically illustrates the operation of the network camera of Embodiment 3.

Here, FIG. 7(A) shows a region that the network camera NC of this embodiment takes in the first image-taking mode (low resolution of CIF level). Through the driver software on the server computer SC, the administrator in charge of the network camera NC can freely set regions for which there is the risk of problems regarding privacy, such as window of buildings or the like, and for which image-taking at high resolution (region enclosed by a dotted line in FIG. 7(A)) should be prohibited.

As a method for setting the prohibited image-taking region, there is the method of selecting the three parameters for pan angle and tilt angle of the video camera VC (pan head T) corresponding to the prohibited image-taking region and the focal length of the image-taking lens L, and to store these parameters in the memory of the control computer CC as a map of prohibited image-taking region data, as schematically indicated by the hatched regions in FIG. 7(B). However, other methods of setting the prohibited image-taking region are also possible.

Then, after the setting of the prohibited image-taking region for high resolution is finished, the procedure advances to Step 64.

On the other hand, in the moving image taking state with a low resolution of 30 frames per second (image-taking state in the first image-taking mode), when an order to switch to high-resolution image taking (second image-taking mode) is entered into the control computer CC from any of the ordinary computers C1 to C3, then the procedure advances to Step 64.

At Step 64, the control computer CC (pixel number control circuit 15) detects the current parameters pan angle and tilt angle of the video camera VC (pan head T) and focal length of the image-taking lens L, and compares these detected parameters with the parameters of the map data for the prohibited high-resolution image-taking region that have been set in Step 62, which are retrieved from the memory of the control computer CC. The current parameters can be detected by reading in pan angle information and tilt angle information that has been sent from the pan head T to the control computer CC, and reading in focal length information that has been sent from the video camera VC to the control computer CC.

Then, when the result of this comparison is that all of the three detected parameters fall into the map of the prohibited image-taking region, that is, when the prohibited image-taking region is included in a large portion of the image-taking field that is about to be taken, as shown in FIG. 7(C), then the procedure advances to Step 65.

At Step 65, the control computer CC distributes over the network N a warning image stating that such image-taking is prohibited, as shown in FIG. 7(E), and cancels the order to switch to high-resolution image-taking at Step 66.

On the other hand, if at Step 64 at least one of the three detected parameters is outside the map of the prohibited image-taking region (for example with the image-taking region settings shown in FIG. 7(D)), then the control computer CC switches the video camera VC to the second image-taking mode at Step 67, and lets it take images at high resolution, and the high-precision image is distributed over the network N at Step 68.

Embodiment 4

The foregoing Embodiments 1 to 3 have been explained for the case that image-taking at high resolution is prohibited in response to the detection result of the focal length of the image-taking lens L, the result of determining the object with the image recognition circuit 18 or when a prohibited image-taking region is included in the image-taking field. This embodiment explains the case that high-resolution image-taking is allowed, distribution of the taken images over the network N is prohibited, and the taken image is saved in the server computer SC.

Figure 8:
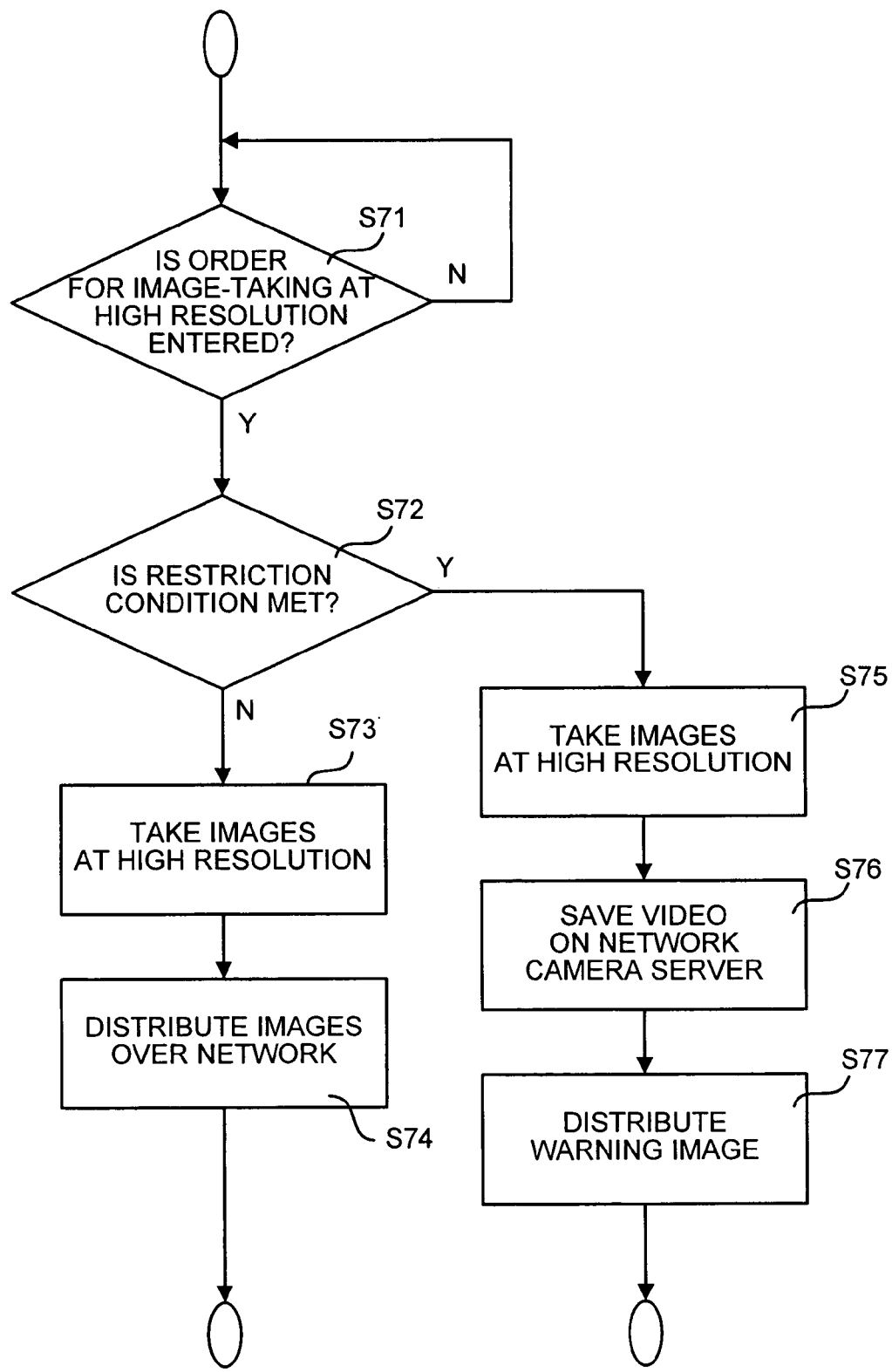
FIG. 8 is a flowchart illustrating the operation of the network camera used in the network image-taking system according to Embodiment 4 of the present invention.

FIG. 8 is a flowchart showing the operation of the network camera NC of Embodiment 4 of the present invention (mainly the pixel number control circuit 15). It should be noted that the overall structure of the network image-taking system is similar to that of Embodiment 1.

First, in the moving image taking state with a low resolution of 30 frames per second (image-taking state in the first image-taking mode), when, at Step 71, an order to switch to high-resolution image-taking (second image-taking mode) is entered from any of the ordinary computers C1 to C3 to the control computer CC, then the procedure advances to Step 72, and the control computer CC (pixel number control circuit 15) determines whether the image that is about to be taken with high resolution meets a restriction condition of high-resolution image-taking. This restriction condition may also be a condition as given in the Embodiments 1 to 3. That is to say, it is determined whether the focal length of the image-taking lens L is equal to or longer than a predetermined focal length, whether the principal object is a close-up of a person or a window of a building, or whether the image-taking field includes a prohibited image-taking region (or in this embodiment, a prohibited distribution region).

If no restriction condition is met, then the procedure advances to Step 73, and the control computer CC switches the video camera VC to the second image-taking mode, and lets it take images at high resolution, and the image is distributed over the network N at Step 74.

Here, when images of a busy street are distributed, then there may be a problem with the privacy of people on this busy street, so that it is preferable that these people are not pictured at high resolution. However, if the resolution on the network N is low and a general viewer viewing the taken images discovers someone who resembles a criminal or witnesses a situation like the scene of a crime, then it is conceivable that the criminal investigation is abetted by showing more detailed images.

In this case, it is desirable that the criminal investigation can be assisted while achieving the protection of privacy for individuals.

Therefore, if the restriction condition for high-resolution image-taking is met in Step 72, the procedure advances to Step 75. At Step 75, the control computer CC switches the video camera VC to the second image-taking mode, as in Step 73, and lets it take an image at high resolution. However, at the next Step 76, the taken image is not distributed over the network N, but is sent to the server computer SC, and saved to the internal memory (hard disk, optical disk, semiconductor memory or other storage medium) M of the server computer SC shown in FIG. 1A. Then, in Step 77, the control computer CC distributes over the network N a warning image stating that such image-taking is prohibited.

At Step 77, a warning image as shown in FIG. 9 is distributed over the network N, and considering that the image taken at high resolution might be related to a crime, it contains the information that the image taken at high resolution is saved to the server computer SC as well as the contact information of the administrator.

When the administrator has been contacted by persons wanting to assist in the criminal investigation by viewing the images taken at high resolution, then the administrator can enter the password into the server computer SC to output those images stored in the server computer SC, and bring them to the police or the like, which can be useful for the criminal investigation.

With the above-described Embodiments 1 to 4, it is possible to ensure that a close-up image of a person's face or a window of a building (showing details of the person or room) are not taken at high resolution with the second image-taking mode, or that such images are not distributed over the network. Consequently, it is possible to let an unspecified number of people enjoy the taken images over the network while taking into account the protection of privacy of the pictured individuals.

Moreover, when the image-taking is performed in the second image-taking mode, but the taken image is not distributed over the network but saved to the memory, and only the administrator of the image-taking apparatus can read out the taken image, then it is possible to make use of the taken image for criminal investigations, while taking into account the protection of privacy of individuals.

Embodiment 5

Figure 10:
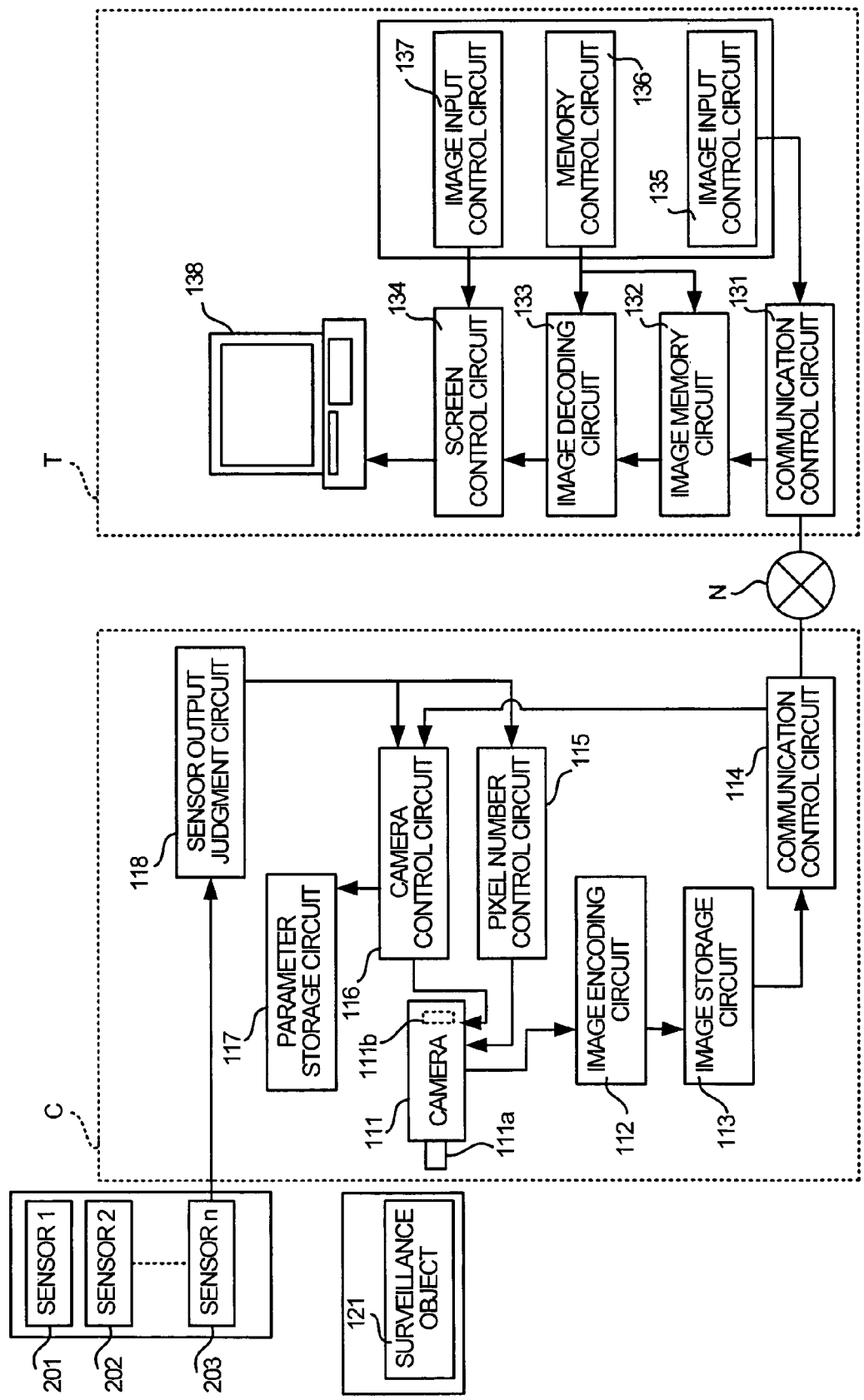
FIG. 10 is a block diagram showing the structure of an image-taking system according to Embodiment 4 of the present invention.

FIG. 10 shows an image-taking system according to Embodiment 5 of the present invention. In this figure, N denotes a communication network, such as a LAN, a WAN, the Internet or an Ethernet. It should be noted that this network N is not necessarily a wired network, but may also be a wireless network.

Connected to this network N are a surveillance camera apparatus (image-taking apparatus) C and a surveillance terminal apparatus T made of a personal computer or the like with which the surveillance camera apparatus C can be operated through the network N.

In the surveillance camera apparatus C, reference numeral 111 denotes a camera (video camera) which can take moving images and still images, and which includes an image-taking optical system 111a and an image-pickup device 111b made of a CCD or CMOS sensor which can take images by photoelectrically converting object images formed by the image-taking optical system 111a. This camera 111 has a zoom function with which the zoom ratio of the image-taking optical system 111a can be changed, and is mounted onto a pan head (not shown in the drawings). Panning and tilting changing the image-taking direction is possible by driving the pan head.

Reference numeral 112 denotes an image encoding circuit which encodes data of images (moving images or still images) taken with the camera 111, and reference numeral 113 denotes an image storage circuit which stores the encoded image data.

If moving images are taken at a high frame rate of 30 frames per second with the camera 111, then images are taken at a regular resolution of the CIF level (352×288 pixels), the NTSC level or the PAL level, due to restrictions on the image processing speed or the capacity of the communication line.

The camera 111 of this embodiment has an image-pickup device 111b with a high number of pixels that is suitable for high-resolution images. By using an image-pickup device 111b with a high number of pixels, it is possible to take images at a regular resolution of the CIF level or the NTSC level when taking images at a high frame rate of 30 frames per second, and to use the pixels of the image-pickup device 111b fully and take images at a resolution that is higher than the regular resolution, for example at XGA level (1024×768 pixels) when taking still images or when taking images at a low frame rate of one or two frames per second.

Reference numeral 115 denotes a pixel number control circuit which switches between taking images at regular resolution and high frame rate (first image-taking mode) and taking still images or moving images with low frame rate at high resolution (second image taking mode) Reference numeral 116 denotes a camera control circuit which controls the panning, tilting and zooming of the camera 111.

Reference numeral 114 denotes a communication control circuit which sends the taken images over the network N to the surveillance terminal apparatus T (the client when the surveillance camera apparatus C acts as the server). The communication control circuit 114 also receives pan, tilt and zoom control signals and image-taking resolution command signals over the network N from the surveillance terminal apparatus T. The received pan, tilt and zoom control signals are sent to the camera control circuit 116, and the image-taking resolution command signals are sent to the pixel number control circuit 115. This enables the operation of the surveillance camera apparatus (camera 111) through the surveillance terminal apparatus T.

A plurality of sensors 201 ... 20n is arranged around the surveillance object 121 that is being monitored. In the case that the surveillance object 121 is inside a building, the sensors 201 ... 20n are provided at a plurality of entrances and detect when those entrances are opened, and in the case that the surveillance object 121 is in an open location such as a park or the like, the sensors 201. 20n are provided at a plurality of locations and detect the motion of persons at the locations where those sensors are provided.

In the state that no signal of detecting anomalies is output from any of the plurality of sensors 201 ... 20n, a sensor output judgment circuit 118 which senses the output from the sensors sends a signal commanding image-taking at regular resolution in the first image-taking mode to the pixel number control circuit 115 and the camera control circuit 116. When the camera control circuit 116 receives this signal, it accesses the parameter storage circuit 117, reads out control parameters that have been previously stored in order to control panning, tilting and zooming of the camera 111 during ordinary operation, and controls the camera 111 in accordance with these parameters. Thus, the image-taking direction and the zoom ratio are set such that the camera 111 can take a wide range, centered on the middle of the surveillance object 121, such as the inside of a building or a park or the like.

Moreover, when the pixel number control circuit 115 receives a signal commanding image-taking at regular resolution, it lets the camera 111 perform image-taking at a pixel number of the CIF level.

On the other hand, when any of the plurality of sensors 201 to 20n outputs a signal indicating that an abnormality is detected, then a sensor output judgment circuit 118 sends the number of the sensor to the camera control circuit 116. The parameter storage circuit 117 stores optimum control parameters for the camera 111 that have been determined in advance in accordance with the number of the sensor detecting an abnormality. The camera control circuit 116 receiving the number of the sensor detecting the abnormality from the sensor output judgment circuit 118 reads out the control parameters corresponding to that sensor (with that number) from the parameter storage circuit 117, changes the pan, tilt and zoom ratio parameters of the camera 111, and sets the optimum direction and zoom ratio for taking a close-up of the surveillance object 121 corresponding to the surroundings of that sensor.

Moreover, the sensor output judgment circuit 118 judges whether high-resolution image-taking in the second image-taking mode is performed in accordance with the number of the sensor that has detected an abnormality. For example, if an abnormality signal is received from a sensor detecting that the doorway of the building is opened, then an image is taken at high resolution, because it is preferable to allow identification of the face of the person entering the building. On the other hand, if an abnormality signal is received from a sensor detecting the movement of a person in a public space, such as a park, then it is sufficient to take an image at regular resolution, because there is little need to identify the face of that person (and the privacy of that person should be respected instead).

The sensor output judgment circuit 118 which has judged that an image should be taken at high resolution, sends to the pixel number control circuit 115 a signal commanding a switch to the second image-taking mode. The pixel number control circuit 115 receives this signal and switches the number of image-taking pixels of the camera 111 to a high pixel number, such as the XGA level. Thus, high-resolution image-taking is performed.

The image taken in this manner is sent to the image encoding circuit 112, which performs a compression process, and is temporarily stored in the image storage circuit 113. When there is an image send request from the surveillance terminal apparatus T, the communication control circuit 114 reads out the corresponding image data from the image storage circuit 113, and sends it through the network N to the surveillance terminal apparatus T.

In the surveillance terminal apparatus T, reference numeral 131 denotes a communication control circuit which controls the communication with the surveillance camera apparatus C, reference numeral 132 denotes an image storage circuit which stores compressed image data received via the network N, and reference numeral 133 denotes an image decoding circuit which restores (decodes) the received compressed image data into the original image data. Reference numeral 134 denotes a screen control circuit which displays the restored image data as an image on a monitor 138.

Moreover, reference numeral 135 denotes an image input control circuit which sends a command signal commanding the image-taking direction, the zoom ratio and the image-taking resolution (pixel number) of the camera 111 from the surveillance terminal apparatus T through the network N to the surveillance camera apparatus C. The parameter control of the pan, tilt and zoom ratio parameters of the camera 111, which depend on the output of the sensors 201 to 20n, can be performed independently from the pixel number and frame-rate control, by outputting command signals from the image input control circuit 135 in response to an operation (such as a mouse click) on the monitor screen by the operator watching the monitor 138 of the surveillance terminal apparatus T. The command signals output from the image input control circuit 135 are sent via the communication control circuit 114 of the surveillance camera apparatus C to the pixel number control circuit 115 and the camera control circuit 116. The pixel number control circuit 115 and the camera control circuit 116 change the pixel number, the frame rate and the parameters that have been set so far, in accordance with the received command signals. Thus, it becomes possible to take an image that the operator wants to see, through the camera 111.

It should be noted that when the command signal that is output by the image input control circuit 135 is a signal that changes the zoom ratio to the telephoto end or to the vicinity of the telephoto end, then the pixel number control circuit 115 receiving this signal may switch the image pixel number to the XGA level. This is because it is mostly desired to view clear images when image-taking at the telephoto end side is desired.

Reference numeral 136 is a memory control circuit which reads out the encoded image data that has been temporarily stored in the image storage circuit 132, and controls the image decoding circuit 133 that decodes this image data. Reference numeral 137 is an image output control circuit that controls the switching of the image control circuit 134, which carries out the display in NTSC, PAL or digital format.

With the present embodiment, image-taking is ordinarily performed with the regular resolution in the first image-taking mode, but in response to an abnormality detection signal from the sensors monitoring the surveillance object 121 or a command signal from the surveillance terminal apparatus T, image-taking with high resolution in the second image-taking mode can be performed, so that it is possible to retain evidentiary images of accidents or incidents at high resolution. Moreover, depending on the position of the sensor detecting an abnormality, the camera 111 is driven in the appropriate image-taking state (panning, tilting and zoom ratio) of the surveillance object 121, so that it is possible to retain optimal images as evidentiary images.

Figure 11:
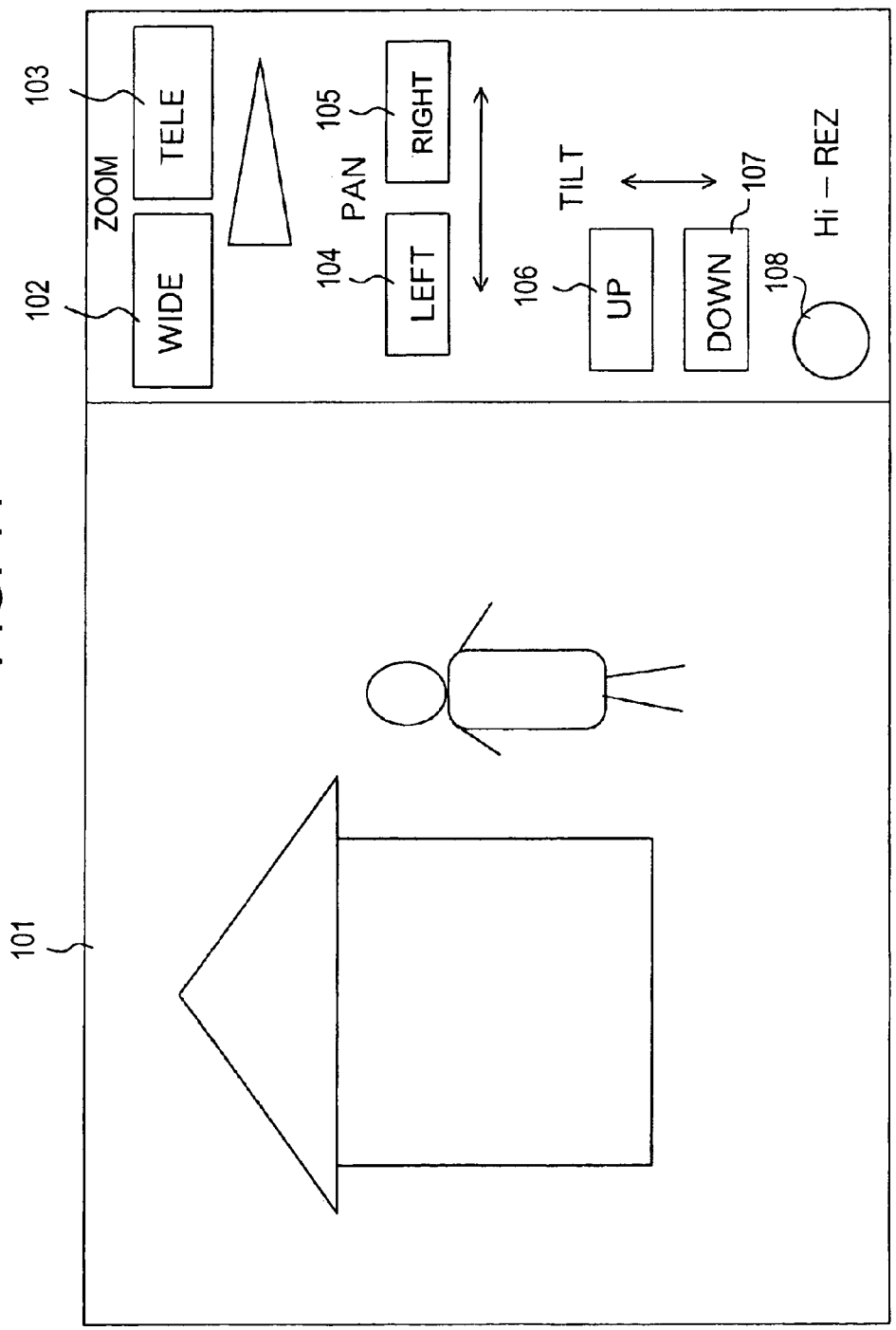
FIG. 11 schematically shows a display example of an image taken with the image-taking system according to Embodiment 4.

FIG. 11 schematically shows the situation when a moving image taken by the camera 111 is displayed on the monitor 138 of the surveillance terminal apparatus T. The portion on the left side in FIG. 11 is an image display screen 101 on which the moving image is displayed. The portion on the right side is an operating panel constituting an operating portion of the image input control circuit 135 shown in FIG. 10. Displayed inside this operation screen are pan operation buttons 104 and 105, tilt operation buttons 106 and 107, and zoom operation buttons 102 and 103. More specifically, a wide button 102 for changing the field angle of the image-taking optical system 111a to the wide-angle side, a tele button 103 for changing the field angle to the telephoto side, a left button 104 and a right button 105 for panning the camera 111 to the left and right, an up button 106 and a down button 107 for tilting the camera 111 up and down, and a high resolution button 108 for image-taking at high resolution are arranged in that order from the top of the operating panel.

Operating these buttons by mouse clicks on the screen, corresponding command signals are sent from the image input control circuit 135 to the surveillance camera apparatus C. By outputting command signals corresponding to the pan, tilt and zoom operating buttons 102 to 108, the camera 111 pans, tilts and zooms, and when a command signal corresponding to the high resolution image-taking button 108 is output, the camera 111 takes an image at high resolution in the second image-taking mode.

Here, if high-resolution image-taking is performed by the camera 111, then it is not possible to take the intended clear image when taking an image that is out of focus. Thus, in the present embodiment, in this case, the surveillance camera apparatus C (pixel number control circuit 115) prohibits (does not perform) high-resolution image taking, and sends a signal causing a display of the fact that high-resolution image-taking is prohibited to the surveillance terminal apparatus T.

Figure 12:
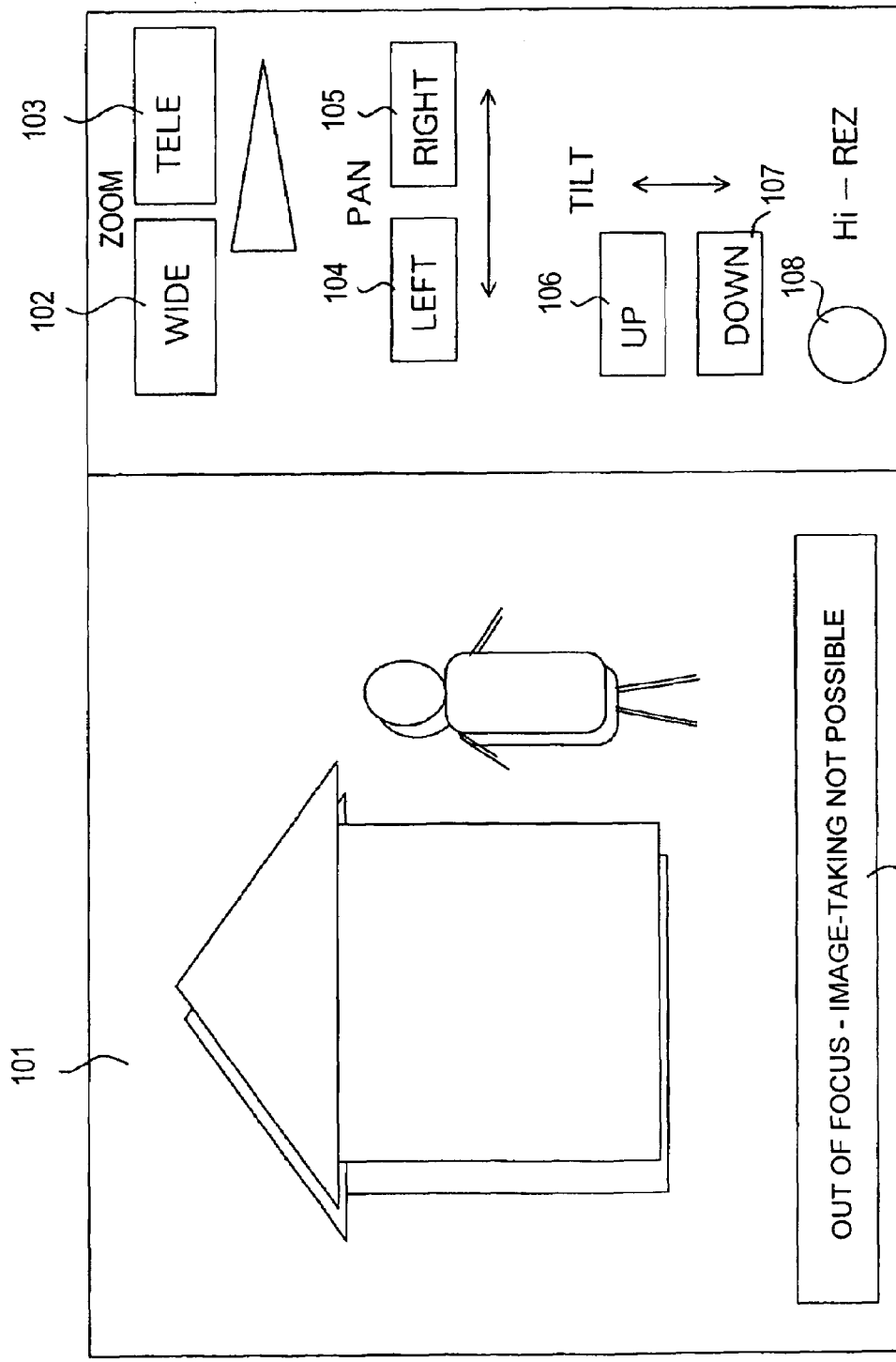
FIG. 12 schematically shows a display example of an image taken with the image-taking system according to Embodiment 4.

FIG. 12 shows the situation of the display on the monitor 138 for this case. Reference numeral 109 is a display of the fact that high-resolution image-taking is prohibited, which is displayed inside the image display screen 101. It should be noted that what is displayed on the image display screen 101 is the image taken at ordinary image resolution, showing the out-of-focus state.

Besides out-of-focus images, also in case of underexposure and overexposure (when a predetermined exposure is not attained), the surveillance camera apparatus C (pixel number control circuit 115) prohibits (does not perform) high-resolution image-taking and sends a signal causing a display of the fact that high-resolution image-taking is prohibited to the surveillance terminal apparatus T.

Figure 13:
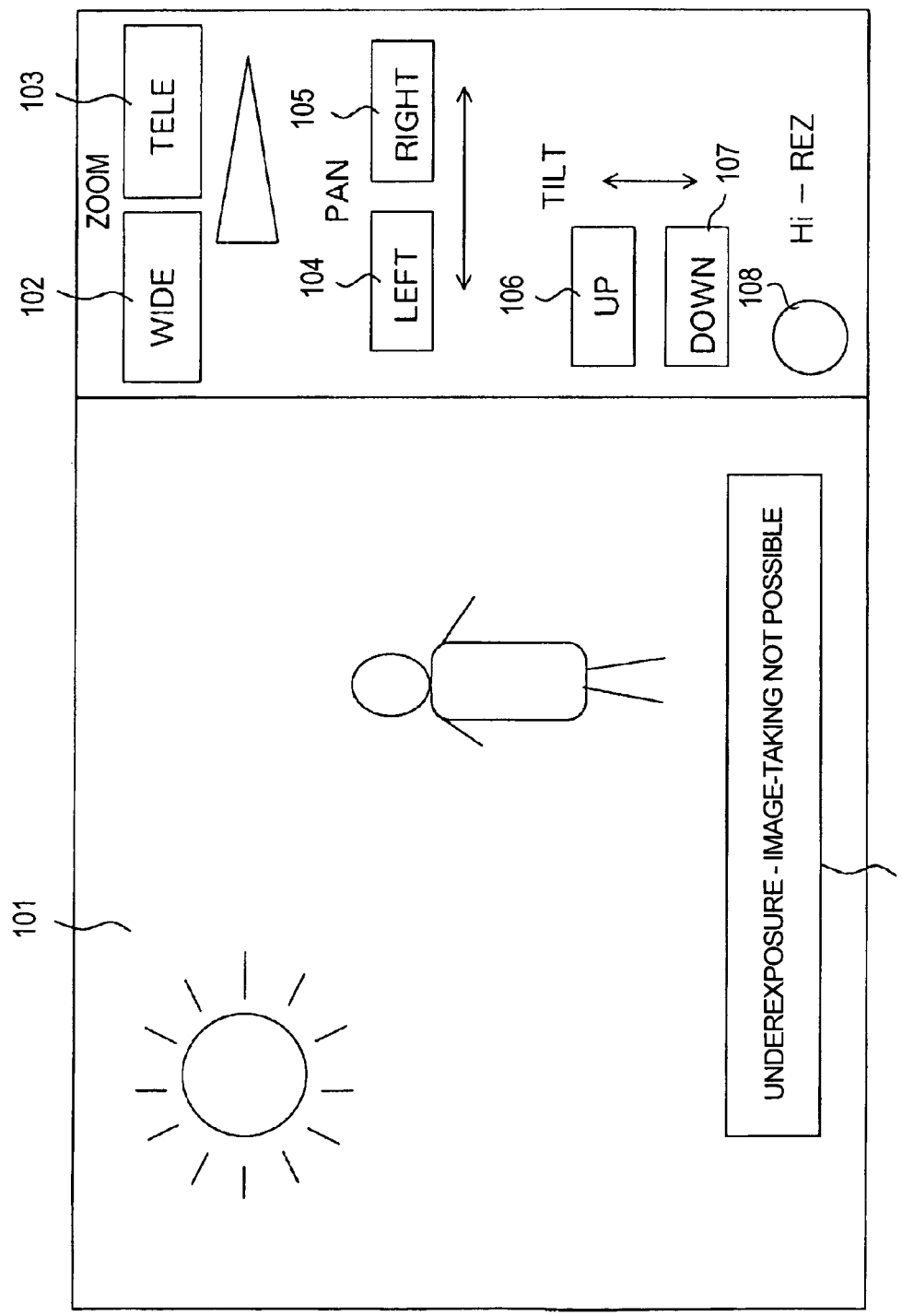
FIG. 13 schematically shows a display example of an image taken with the image-taking system according to Embodiment 4.
Figure 14:
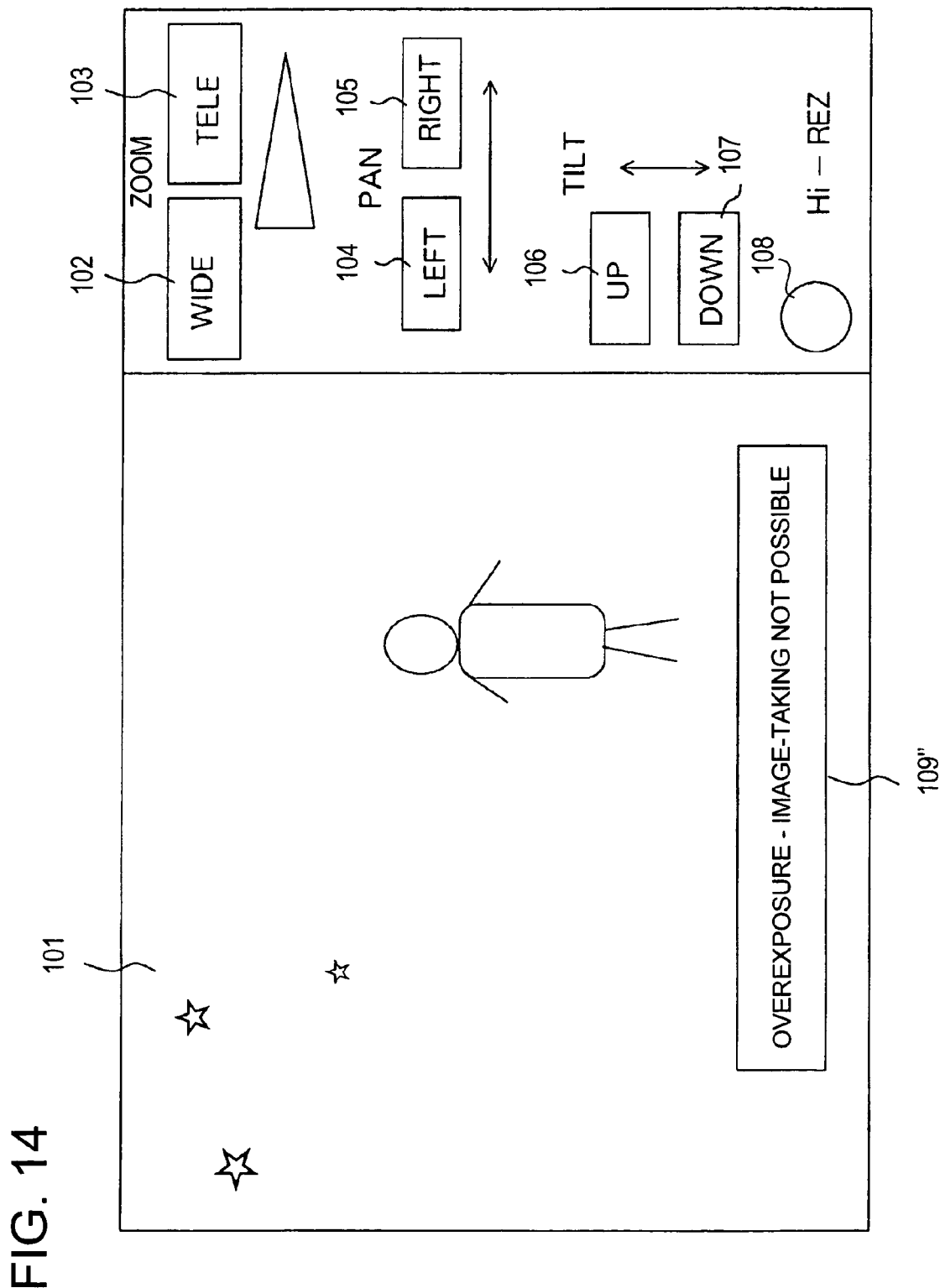
FIG. 14 schematically shows a display example of an image taken with the image-taking system according to Embodiment 4.

FIGS. 13 and 14 show the screen display for the cases of underexposure and overexposure, respectively. Reference numerals 109' and 109" denote displays of the fact that high-resolution image-taking is prohibited, which are displayed inside the image display screen 101. It should be noted that what is displayed on the image display screen 101 is the image taken at ordinary image resolution.

It should be noted that FIGS. 12 to 14 show cases in which the fact that high-resolution image-taking is prohibited is displayed inside the image display screen 1, but it is also possible to let the high-resolution image-taking button 108 blink or to let another warning lamp (not shown in the drawings) light up or blink.

Figure 15:
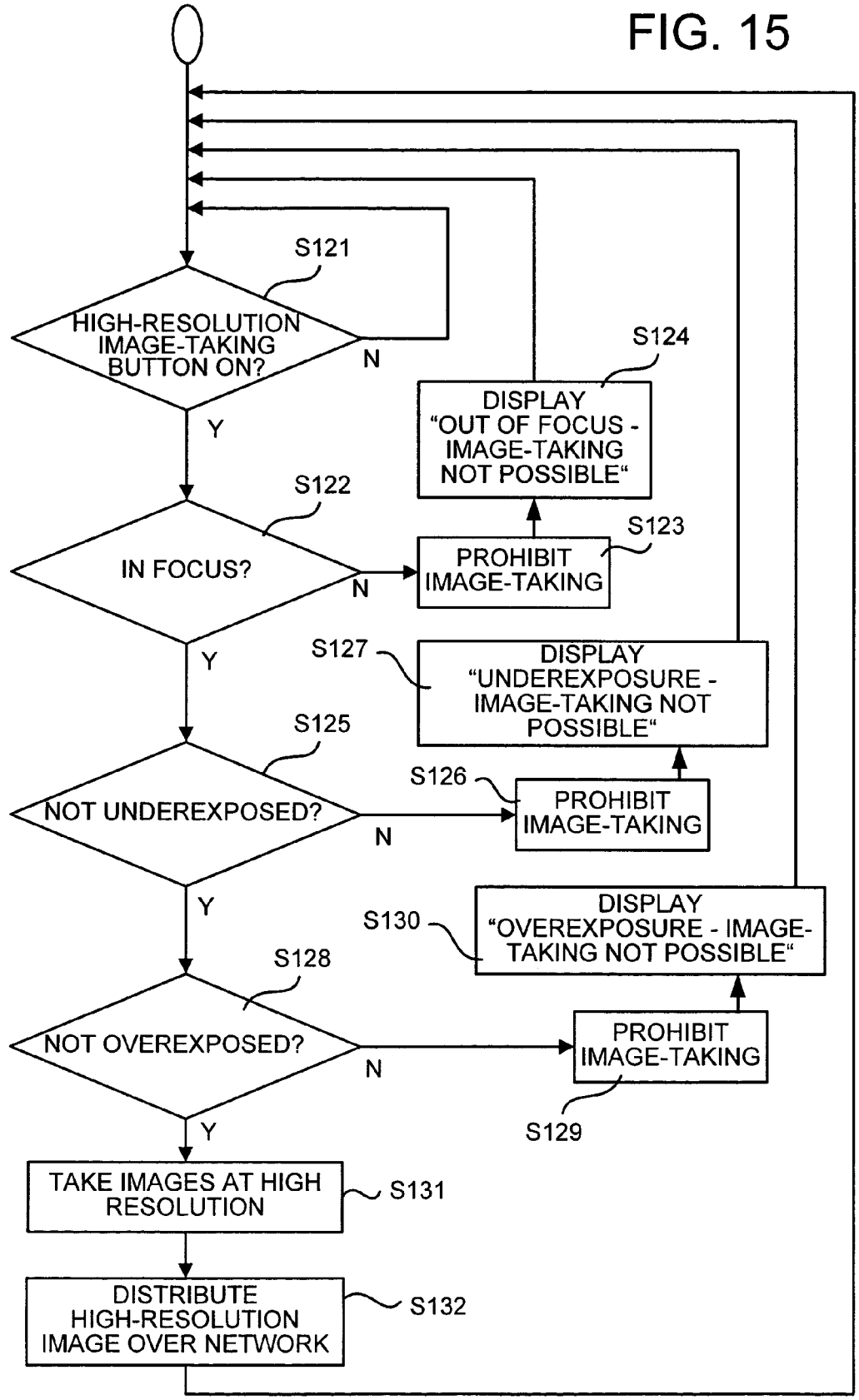
FIG. 15 is a flowchart illustrating the operation of a surveillance camera apparatus constituting the image-taking system according to Embodiment 4.

Referring to FIG. 15, the following is a description of the operations regarding high-resolution image-taking with the surveillance camera apparatus C (mainly the pixel number control circuit 115).

Here, an application is installed for operating the surveillance camera apparatus C and displaying the image from the surveillance camera apparatus C with the surveillance terminal apparatus T. This application is started up, and the image (moving image of regular resolution) from the surveillance camera apparatus C is displayed with the surveillance terminal apparatus T.

First, in Step 121 (in the drawings, "Step" is abbreviated as "S"), it is determined whether the high-resolution image-taking button 108 on the surveillance terminal apparatus T is turned ON, and a signal commanding high-resolution image-taking output from the surveillance terminal apparatus T is received or not. If such a command signal is not received, then the procedure returns to Step 121, and this step is repeated. If such a command signal is received, then the procedure advances to the following Step 122.

At Step 122, it is confirmed whether the image-taking optical system 111a shown in FIG. 10 is in focus or not. The determination whether it is in focus can be made using various autofocus techniques, and in the present embodiment, a technique is used in which high-frequency components are extracted from the image signal from the image-pickup device shown in FIG. 10, and if the value of these high-frequency components becomes a maximum value, then the image-taking optical system 111a is determined to be in focus. If it is determined that it is not in focus, then the procedure advances to Step 123.

At Step 123, high-resolution image taking is prohibited (restricted), and the procedure advances to Step 124. At Step 124, a signal is sent to the surveillance terminal apparatus T which causes a display, as shown in FIG. 12, of the fact that image-taking is prohibited because the image is out of focus. Then, the procedure returns to Step 121.

On the other hand, if it is determined at Step 122 that the image is in focus, then the procedure advances to Step 125. At Step 125, it is determined whether there is underexposure or not. This determination whether there is underexposure or not can be made using a variety of auto-exposure techniques, and in the present embodiment, it is made using the following technique.

The image shown in FIG. 13 shows the case that there is a very bright light source, such as the sun, in the background, and the person whose image is to be taken (principal object) is in the foreground. In this case, the exposure is dominated by the very bright light source in the background, so that for an average exposure, the face of the person in the foreground becomes so dark that it cannot be identified. Using this, the luminance at the focused position (position of the principal object) is compared with the luminance of the background and the average luminance, and the image is judged to be underexposed if the value obtained by subtracting the average luminance from the luminance of the principal object is a negative value (i.e. dark) that is lower than a predetermined value.

This is also conceivable in the case that the background is made largely of glass, such as the entrance of a large building or the like, and is thus very bright, and a person (principal object) in front of the entrance is so dark that his or her face cannot be identified.

In such a case of underexposure, the procedure advances to Step 126. At Step 126, image-taking at high resolution is prohibited (restricted), and the procedure advances to Step 127. At Step 127, a signal is sent to the surveillance terminal apparatus T that causes a display, as shown in FIG. 13, of the fact that image-taking is prohibited because the image is underexposed. Then, the procedure returns to Step 121.

On the other hand, if it is determined at Step 125 that the image is not underexposed, then the procedure advances to Step 128. At Step 128, it is determined whether there is overexposure or not. This determination whether there is overexposure or not can be made using a variety of auto-exposure techniques, and in the present embodiment, it is made using the following technique.

In the case that there are very dark light sources, such as starlight, in the background, as shown in FIG. 14 for example, and the person in the foreground, whose image is to be taken (principal object) carries a bright light source, such as a torch light, then, at average exposure, the exposure is dominated by the very dark light sources in the background, so that the face of the person in the foreground becomes so bright that it cannot be identified. Using this, the luminance at the focused position (position of the principal object) is compared with the luminance of the background and the average luminance, and the image is judged to be overexposed if the value obtained by subtracting the average luminance from the luminance of the principal object is a positive value (i.e. bright) that is higher than a predetermined value.

In such a case of overexposure, the procedure advances to Step 129. At Step 129, image-taking at high resolution is prohibited (restricted), and the procedure advances to Step 130. At Step 130, a signal is sent to the surveillance terminal apparatus T that causes a display, as shown in FIG. 14, of the fact that image-taking is prohibited because the image is overexposed. Then, the procedure returns to Step 121.

If the image is in focus and is neither underexposed nor overexposed, that is, if the conditions for high-resolution image-taking are met, then the procedure advances to Step 131, and the camera 111 is caused to take images at high resolution (that is, to take a still image or to take a moving image at a low frame rate).

Then, the procedure advances to Step 132, and the taken image is sent via the network N to the surveillance terminal apparatus T. At this point, the camera 111 returns to image-taking at regular resolution. Then, the procedure returns to Step 121, and the image-taking of moving images at regular resolution is continued.

Thus, with the surveillance camera apparatus C of the present embodiment, when there is a command for high-resolution image-taking from the surveillance terminal apparatus T, and when it is determined that the image is out of focus or not properly exposed, then image-taking at high resolution (image-taking in the second image-taking mode) is prohibited, so that it can be avoided that a large data amount of an image is sent out over the network N even though the image is no good as a high resolution image.

Embodiment 6

Embodiment 5 has been explained for the case that high-resolution image-taking is prohibited when the image is out of focus or not properly exposed. In Embodiment 6, can respond to the case that the viewer wants to take a high-resolution image in spite of this situation.

It should be noted that the basic structure of the surveillance camera apparatus C and the surveillance terminal apparatus T of this embodiment is the same as that in Embodiment 5, so that structural elements that are the same as in Embodiment 5 have been given the same reference numbers.

Figure 16:
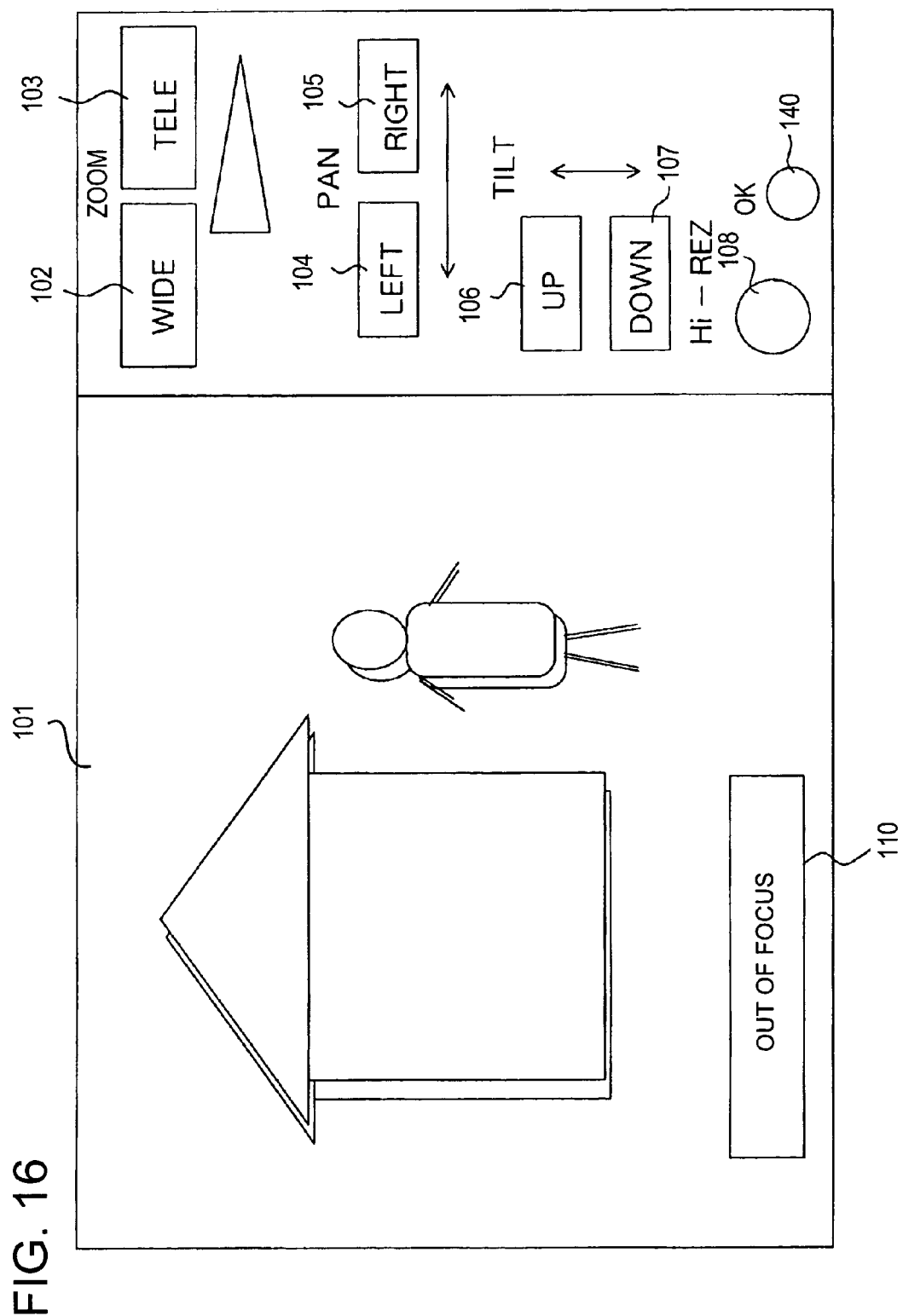
FIG. 16 schematically shows a display example of an image taken with an image-taking system according to Embodiment 5.

However, in this embodiment, an OK switch 140 as shown in FIG. 16 is added to the operating panel on the monitor screen of the surveillance terminal apparatus T. With this OK switch 140, high-resolution image-taking can be forcibly performed even in situations in which high-resolution image-taking is prohibited as described above.

Figure 17:
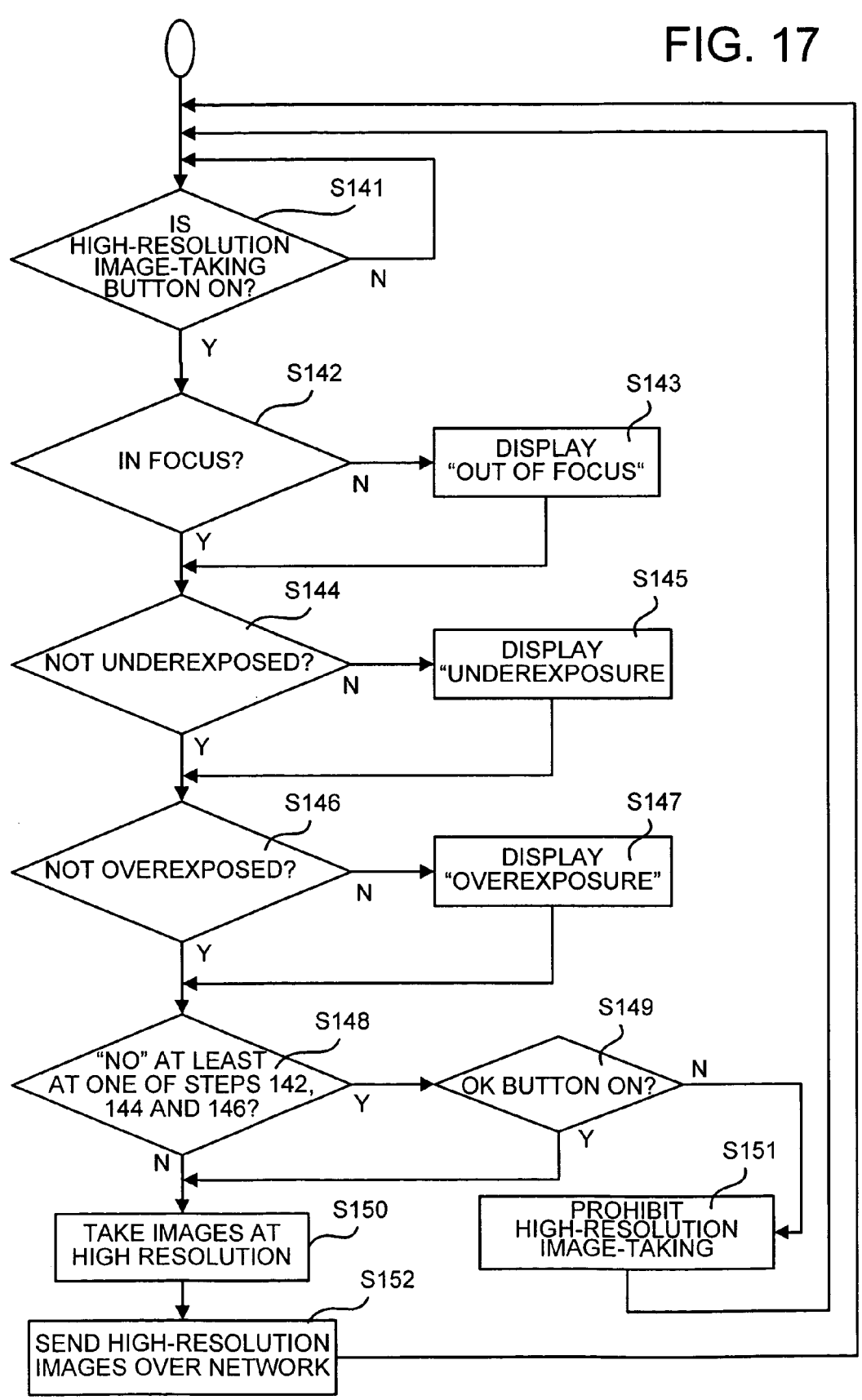
FIG. 17 is a flowchart illustrating the operation of a surveillance camera apparatus constituting an image-taking system according to Embodiment 6.

FIG. 17 illustrates the operations regarding high-resolution image-taking with the surveillance camera apparatus C (the pixel number control circuit 115) of this embodiment.

Here, an application is installed for operating the surveillance camera apparatus C and displaying the image from the surveillance camera apparatus C with the surveillance terminal apparatus T. This application is started up, and the image (moving image of regular resolution) from the surveillance camera apparatus C is displayed with the surveillance terminal apparatus T.

First, in Step 141, it is determined whether a signal commanding high-resolution image-taking is received from the surveillance terminal apparatus T whose high-resolution image-taking button 108 is turned ON. If such a command signal is not received, then the procedure returns to Step 141, and this step is repeated. If such a command signal is received, then the procedure advances to the following Step 142.

At Step 142, it is confirmed, by the same method as explained for Embodiment 5, whether the image-taking optical system 111a shown in FIG. 10 is in focus or not. If it is determined that it is in focus, then the procedure advances to Step 144, and if it is determined that it is not in focus, then the procedure advances to Step 143.

At Step 143, a signal causing a display (warning display) of the fact that the image is out of focus, as shown by 110 in FIG. 16, is sent to the surveillance terminal apparatus T. Then, the procedure advances to Step 144.

At Step 144, it is determined, by the same method as explained for Embodiment 5, whether the image is underexposed or not. If it is determined that it is not underexposed, then the procedure advances to Step 146, and if it is determined that it is underexposed, then the procedure advances to Step 145.

At Step 145, a signal causing a display (warning display) of the fact that the image is underexposed is sent to the surveillance terminal apparatus T. Then, the procedure advances to Step 146.

At Step 146, it is determined, by the same method as explained for Embodiment 5, whether the image is overexposed or not. If it is determined that it is not overexposed, then the procedure advances to Step 148, and if it is determined that it is overexposed, then the procedure advances to Step 147.

At Step 147, a signal causing a display (warning display) of the fact that the image is overexposed is sent to the surveillance terminal apparatus T. Then, the procedure advances to Step 148.

At Step 148, it is confirmed whether it has been determined at Step 142 that the image is in focus, whether it has been determined at Step 144 that the image is not underexposed, and whether it has been determined at Step 146 that the image is not overexposed, and if all three determination results are affirmative (YES), then the procedure advances to Step 150.

On the other hand, if at least one of these three determination results is negative (NO), that is, if the conditions for high-resolution image-taking are not satisfied, then the procedure advances to Step 149.

At Step 149, it is determined whether the operator seeing the warning display on the surveillance terminal apparatus T turns on the OK button 140 for performing high-resolution image-taking nonetheless, that is, whether a signal commanding forced image-taking is received. If such a command signal is received, then the procedure advances to Step 150. If such a command signal is not received even after waiting a predetermined time, then the procedure advances to Step 151, and high-resolution image-taking is prohibited.

At Step 150, the camera 111 is caused to take an image at high-resolution. Then, the procedure advances to Step 152, and the taken image is sent via the network N to the surveillance terminal apparatus T.

At this point, the camera 111 returns to image-taking at regular resolution. Then, the procedure returns to Step 141, and the image-taking of a moving image is continued.

Thus, with the surveillance camera apparatus C of this embodiment, when high-resolution image-taking is commanded from the surveillance terminal apparatus T, and when it is determined that the image is not in focus or proper exposure is not attained, then a warning is displayed on the surveillance terminal apparatus T, and when high-resolution image-taking is commanded nonetheless, then high-resolution image-taking is carried out. Therefore, it is possible to obtain the necessary high-resolution images even when the image quality is not sufficiently good, and the sending of images of unnecessarily large data volumes over the network N can be avoided.

In the above-described Embodiments 5 and 6, an operation has been described for restricting image-taking at high resolution when the image is out of focus and proper exposure is not attained, but it is also possible to carry out the image-taking (carry out storage to the image storage portion 113), but perform an operation for restricting the sending (distribution) of the taken images to the network (the terminal apparatus), that is, to prohibit distribution and display a warning. Also in this case, it can be avoided that images of unnecessarily large data volumes are sent over the network N. Also, by storing them in the image storage portion 113, specifically authorized persons may read out and view those images from the image storage portion 113.

Moreover, even when there is a restriction to the distribution of images, it is possible to forcefully send images that have been taken at high resolution to the terminal apparatus by operating for example an OK button on the terminal apparatus.

It should be noted that Embodiments 5 and 6 have been explained for surveillance camera apparatuses, but the present invention can also be applied to any image-taking apparatus that has a function for taking images of a busy street or a landscape or the like, and sending those images over a network. Also, regarding the terminal apparatus, the present invention is not limited to stationary personal computers, and it is also possible to use portable computer terminals or mobile phones or the like that can be connected by wire or wirelessly to a network. Furthermore, there is no limitation to one terminal apparatus, and there may be a plurality of terminal apparatuses.

While preferred embodiments have been described, it is to be understood that modification and variation of the present invention may be made without departing from scope of the following claims.

What is claimed is:

1. An image-taking apparatus which is operated through a network from a terminal apparatus and which distributes taken images over the network, comprising:
   an image-taking optical system;
   an image-pickup device which photoelectrically converts an object image formed by the image-taking optical system; and
   a controller which performs, by using the image-pickup device, image-taking in a first mode and image-taking in a second mode in which image-taking is carried out with more pixels or at a lower frame rate than in the first mode;
   wherein the controller determines whether a condition relating to image-taking matches a predetermined restriction condition, and performs a restriction operation which restricts image-taking in the second mode or distribution of an image taken in the second mode when the restriction condition is met;
   wherein a focal length of the image-taking optical system is variable;
   wherein the controller determines whether the focal length is equal to or longer than a predetermined focal length, and performs the restriction operation when the focal length is equal to or longer than the predetermined focal length; and
   wherein the controller further determines whether an object distance is equal to or shorter than a predetermined object distance, and performs the restriction operation when the focal length is equal to or longer than the predetermined focal length and the object distance is equal to or shorter than the predetermined object distance.

2. The image-taking apparatus according to claim 1, wherein the restriction operation is a prohibition of the image-taking in the second mode or the distribution of the image taken in the second mode.

3. The image-taking apparatus according to claim 1, wherein, as the restriction operation, the controller allows the image-taking in the second mode and the distribution of the image taken in the second mode after changing the focal length to a focal length which is shorter than the predetermined focal length.

4. The image-taking apparatus according to claim 1, wherein, when the distribution of the image taken in the second mode is prohibited as the restriction operation, the controller saves the taken image to a memory from where image can be read out only by an administration of the image-taking apparatus.

5. The image-taking apparatus according to claim 1, wherein the controller sends warning information to the terminal apparatus when performing the restriction operation.

6. The image-taking apparatus according to claim 1, wherein the predetermined object distance and the predetermined focal length can be changed only by an administrator of the image-taking apparatus.

7. An image-taking system comprising:
   the image-taking apparatus according to claim 1, and
   an administrative computer with which an administrator of the image-taking apparatus can control the image-taking apparatus through the network.

8. An image-taking system comprising:
   the image-taking apparatus according to claim 1, and
   a terminal apparatus which operates the image-taking apparatus through the network and which receives a distribution of taken image.

9. An image-taking apparatus which is operated through a network from a terminal apparatus and which distributes taken images over the network, comprising:
   an image-taking optical system;
   an image-pickup device which photoelectrically converts an object image formed by the image-taking optical system; and
   a controller which performs, by using the image-pickup device, image-taking in a first mode and image-taking in a second mode in which image-taking is carried out with more pixels or at a lower frame rate than in the first mode;
   wherein the controller determines whether a condition relating to image-taking matches a predetermined restriction condition, and performs a restriction operation which restricts image-taking in the second mode or distribution of an image taken in the second mode when the restriction condition is met; and
   wherein the controller has a function of recognizing an object in an image-taking field, identifies whether the recognized object is a specific object, and performs the restriction operation when the object is the specific object.

10. The image-taking apparatus according to claim 9, wherein the specific object is a person or a window of a building.

11. The image-taking apparatus according to claim 9, wherein the restriction operation is a prohibition of the image-taking in the second mode or the distribution of the image taken in the second mode.

12. An image-taking system comprising:

the image-taking apparatus according to claim 9; and an administrative computer with which an administrator of the image-taking apparatus can control the image-taking apparatus through the network.

13. An image-taking system comprising:

the image-taking apparatus according to claim 9, and a terminal apparatus which operates the image-taking apparatus through the network and which receives a distribution of taken image.

\* \* \* \* \*